March 24, 1970   E. SCHAEPMAN   3,503,047
EVALUATION UNIT USED IN CONJUNCTION WITH A MEASUREMENT DEVICE
Filed Nov. 21, 1966   9 Sheets-Sheet 4

INVENTOR.
ELLERT SCHAEPMAN
BY
Woodhams, Blanchard and Flynn
ATTORNEYS

United States Patent Office 3,503,047
Patented Mar. 24, 1970

3,503,047
EVALUATION UNIT USED IN CONJUNCTION
WITH A MEASURING DEVICE
Ellert Schaepman, Zurich, Switzerland, assignor to Wirth
Gallo & Co., Zurich, Switzerland
Filed Nov. 21, 1966, Ser. No. 595,930
Claims priority, application Sweden, Nov. 24, 1965,
16,428/65
Int. Cl. G06f 1/00, 7/00
U.S. Cl. 340—172.5                             27 Claims

ABSTRACT OF THE DISCLOSURE

An evaluation apparatus for a measurement device, from the electrical output signals of which measurement values can be determined by integration or counting, characterized in that the apparatus during control periods automatically checks whether the measurement value determined during a measurement period coincides with a comparison value determined from the output signals. The apparatus initiates a new measurement period in case of noncoincidence of the measurement value with the comparison value. The apparatus comprises a first means including a first storage means for storing during the control period a measurement value determined during a measurement period. A second means including a second storage means is provided for determining one comparison value during each control period by integration or counting of the output signals. A coincidence circuit compares the measurement value with the comparison value, and control means initiate the control period in the case of coincidence and a new measurement period in the case of noncoincidence.

---

The invention relates to an evaluation unit used in conjunction with a measurement device, which produces an output that can be integrated by the evaluation unit to determine the magnitude of a measured quantity.

For a measurement value to be determined correctly from the output of a measurement device, the evaluation unit for determing the measurement value must be able to determine when the output changes, and distinguish whether a change in output has been caused by a change in the quantity or magnitude being measured or by disturbances or compensating processes within the integration time.

Since disturbances and compensating processes, as a rule, produce non-stationary changes of state, and changes in the quantities or magnitudes to be measured produce stationary changes of state in the measurement device, ascertaining whether or not stationary or non-stationary changes of state have taken place will provide a criterion for detecting whether one is dealing with a change in the magnitude to be measured or with a disturbance or compensating process. The evaluation unit, therefore, must be able to distinguish whether any change known to have taken place in the output is a stationary or non-stationary change.

What the invention sets out to do, therefore, is to provide an evaluation unit that meets this requirement.

In the invention, this is achieved (in the case of an evaluation unit for a measurement device, from the output magnitudes of which latter measurement values can be determined by integration) by means of a unit which automatically, during control periods, checks the measurement value determined during a measurement period for agreement with the measurement value obtainable from the output magnitudes and, should they not agree, initiates a fresh measurement period; there being an initial store for storing during control periods the measurement value determined during the measurement period, a second store for determinging one comparison value during each control period by integration of the output magnitudes, a coincidence circuit for comparing the measurement value with the comparison values, and controls for initiating a control period in the case of coincidence or a fresh measurement period in the case of non-coincidence.

With this arrangement, there is particular advantage in the fact that one of the two stores can serve during the measurement period for determining the measurement value by integration of the output magnitudes. The initial store may well serve during the measurement period for determining the measurement value; the second store may likewise well serve during the measurement period for determining the measurement value, in which event controls provided for passing the measurement value from the second store to the first store.

One recommended form of the evaluation unit, by way of example, may include: a main store to constitute the initial store, for storing the measurement value determined during the measurement period; an auxiliary store constituting the second store, for determining the measurement value by integration of the output magnitudes over a measurement time during the measurement period and for determining one comparison value in each control period, likewise by integration of the output magnitudes, in each instance over a comparison time during the control periods; a timing unit for determining the duration of the measurement and comparison times; a coincidence circuit for comparing the value stored in the main store with the value determined by the auxiliary store; and controls for initiating a control period in the case of coincidence or a fresh measurement period in the case of non-coincidence, as well as for passing the measurement value from the auxiliary to the main store. Here, the main store may well serve at the same time for indicating the store measurement value.

There is particular advantage in providing an evaluation unit of this kind for a string balance such as that disclosed in U.S. Patent No. 3,423,999 assigned to the assignee of the present invention, which supplies, by way of output magnitudes, impulses of variable pulse frequency, namely an initial pulse train having a pulse frequency increasing according to the weight imposed, which frequency is equal to frequency difference $f_d$ between the frequencies $f_1$ and $f_2$ of two strings of the string balance or equal to an integral multiple of this frequency difference $f_d$, and a second pulse train having a string frequency $f_2$ which drops as the weight increases, the quotient of $f_d/f_2$ being proportional to the sum of the weight imposed and a chosen constant basic value. Here the evaluation unit may include: a counter constituting the auxiliary store, for determining the weight by counting those impulses of the initial pulse train which fall within the measurement time and for determining the comparison values by counting those impulses of the initial pulse train which fall within the comparison times; an adjustable numerical store constituting the main store, for storing the measurement value determined during the measurement period by adjustment of the numerical store to the setting of the counter after the measurement time; a sequence counter constituting the timing unit, for determining the duration of the measurement and comparison times, in each case by counting given numbers of impulses in the second pulse train; a coincidence circuit for comparing the value stored in the numerical store with that determined by the counter; controls for initiating a control period in the case of coincidence or a fresh measurement period in the case of non-coincidence and for adjusting the numerical store to the setting of the counter; and means for adjusting the counter to a setting which takes account of the basic value before each count begins. The unit may with advantage also be so designed that the numerical store serves at the same time to indicate the numerical setting, the signals fed to the coincidence circuit of the numerical store for comparing the numerical setting with the value determined by the counter being derived from the indicating arrangements in the numerical store. In addition, the numerical store may well be provided with an indicator window and a flap for covering this indicator window, controls also being provided for closing the flap during measurement periods and opening it during control periods.

Another advantageous form of the evaluation unit, given by way of example, in which the first store serves during the measurement period for determining the measurement value, may include: a main store for determining the measurement value by integration of the output magnitudes over a measurement time during the measurement period and for storing it during control periods; an auxiliary store for determining on comparison value in each measurement period and one in each control period, likewise by integration of the output magnitudes, in each case over a comparison time during the periods; a timing device for determining the duration of the measurement and comparison times; a coincidence circuit for comparing the measurement value with the comparison value in each period; and controls for initiating a control period in the case of coincidence or a fresh measurement period in the case of non-coincidence and for the requisite distribution of the output magnitudes to the main and auxiliary stores. Here, the length of the comparison time may well be one-half of the length of the measurement time and may fall during measurement periods within the space of the measurement time, when the comparison value produced from an output magnitude per unit time will be twice as great as the measurement value produced from the same output magnitude in the same unit time. The length of the comparison time, however, may also well be as great as the length of the measurement time, both time lengths then succeeding each other in measurement periods and the comparison value produced from an output magnitude per unit time being as great as the measurement value produced from the same output magnitude in the same unit time. With such an evaluation unit, again, there is advantage in providing a sequence control with means whereby, in the event of agreement during comparison (coincidence), the measurement value held in the main store is applied to one or more outgoing lines, the auxiliary store is cleared and a control period is initiated, during which the measurement value contained in the main store is held and the output magnitudes are fed only to the auxiliary store for the determination of a fresh comparison value, and whereby, in the event of non-agreement during comparison (non-concidence), both stores are cleared and a fresh measurement period is initiated, during which the output magnitudes are fed both to the main store for the determination of a fresh measurement value and to the auxiliary store for the determination of a fresh comparison value.

For a string balance, which supplies, by way of output magnitudes, impulses of variable pulse frequency, namely an initial pulse train having a pulse frequency increasing according to the weight imposed, which frequency is equal to frequency difference $f_d$ between the frequencies $f_1$ and $f_2$ of two strings of the string balance or equal to an integral multiple of this frequency difference $f_d$, and a second pulse train having a string frequency $f_2$ which drops as the weight increases, the quotient of $f_d/f_2$ being proportional to the sum of the weight imposed and a chosen constant basic value, this string balance constituting the measurement device, one suitable example of the present evaluation device which may advantageously be used includes: a main counter constituting the main store, for determining the weight by counting those impulses in the first pulse train which fall within the measurement time; an auxiliary counter constituting the auxiliary store, for determining the comparison values by counting those impulses in the first pulse train which fall within the comparison time; a sequence counter constituting the timing unit, for determining the duration of the measurement and comparison times, in each case by counting given numbers of impulses in the second pulse train; a coincidence circuit for comparing the count of the main counter, which constitutes the measurement value following the measurement time, with the count of the auxiliary counter, which constitutes the comparison value following the comparison times; controls for initiating a control period in the case of coincidence or a fresh measurement period in the case of non-coincidence and for the requisite distribution of the impulses in the first pulse train to the main and auxiliary counters; and means for adjusting the main and auxiliary counters to a setting which takes account of the basic value before each count begins.

The controls for initiating a control period in the case of coincidence or a fresh measurement period in the case of non-coincidence may advantageously include a sequence control and gates between a signal wire carrying the first pulse train and the main counter and between this signal wire and the auxiliary counter, while the sequence control may suitably include controls for testing the sequence counter and coincidence circuit, clearing the main, auxiliary and running counters and opening the gates, which, on receipt of a terminal signal indicating the expiration of a period, emit signals for clearing the auxiliary and sequence counters and opening the gate of the auxiliary counter over the comparison period, to initiate a control period, and emit signals for clearing the main, auxiliary and sequence counters and opening the gate of the main counter over the measurement period, as well as switching through the auxiliary counter over the comparison period, to initiate a fresh measurement period, the signals for clearing the main and auxiliary counters serving to put the counters back to negative settings corresponding to the basic value.

The unit may with advantage be so designed, furthermore, that the sequence counter starts counting on completion of each clearing signal and emits an initial time signal when a pre-determined number of impulses in the second pulse train has been counted, this initial time signal in a control period being the signal that marks the expiration of the period, while controls operating in conjunction with those for testing the sequence counter are provided in the sequence control and pass this initial time signal on to the sequence control as a terminal signal in a control period. In a measurement period, after the initial time signal, the sequence counter may then again count off the same number of second pulse-train impulses and then emit a second time signal, this second time signal being the signal that marks the expiration of the measurement period. Moreover, controls operating in conjunction with those for testing the sequence counter may well be provided in the sequence control, to pass this second time signal on to the sequence control as a terminal signal in a measurement period.

Again, the auxiliary counter, when the sequence counter starts counting, may begin counting the first pulse-train impulses and be stopped after the initial time signal by the closing of the gate between the auxiliary counter and the signal wire carrying the first pulse train.

In one example of the evaluation unit, in which the comparison time is one-half of the measurement time and during measurement periods falls within the space of the measurement time and in which the comparison value produced from an output magnitude per unit time is twice as great as the measurement value produced from the same output magnitude in the same unit time, the main counter may with advantage, during a measurement period, when the sequence counter starts counting, begin to count the first pulse-train impulses, count one counting unit forward for each input impulse and, after the second time signal, be stopped, in the case of coincidence, by the closing of the gate between the main counter and the signal wire carrying the first pulse train and be cleared, in the case of non-coincidence, by the clearing signal; in this case, the auxiliary counter will count two counting units forward for each input impulse. For this purpose, the input lead of the auxiliary counter, in order to count two counting units forward for each input impulse, may well be connected to that stage of the auxiliary counter which corresponds to the second binary figure (with positions $0/2^1$).

In an example of the evaluation unit in which the comparison time is equal to the measurement time and both times succeed each other during measurement periods, the comparison value produced from an output magnitude per unit time being equal to the measurement value produced from the same output magnitude in the same unit time, the main counter may with advantage, during a measurement period, when the sequence counter continues counting, after the first time signal, begin counting the first pulse-train impulses, count one counting unit forward for each input impulse and, after the second time signal, be stopped, in the case of coincidence, by the closing of the gate between the main counter and the signal wire carrying the first pulse train and be cleared, in the case of non-coincidence, by the clearing signal; in this case, the auxiliary counter will count one counting unit forward for each input impulse.

Again, the evaluation unit here proposed may be so designed that the coincidence circuit does not bring into the comparison the position of that stage of the main counter which corresponds to the first binary figure (with positions $0/2^0$) or the position of that stage (if any) of the auxiliary counter which corresponds to the first binary figure. It is an advantage, instead of or in addition to this, for controls also to be provided to enable a first comparison of the setting of the auxiliary counter to be made with that of the main counter at the end of a period and to enable further comparisons to be carried out, prior to which the setting of the auxiliary counter is advanced each time by a given number of counting units, as well as to enable the auxiliary counter, at the beginning of the period, to be given a setting, by means of the clearing impulse, which is lower by one compensating value than the setting of the main counter brought about by a clearing impulse, this compensating value being at least approximately equal to one-half the sum of the increases in all practicable comparisons. Any further comparison may then with advantage be made possible only in the case of non-coincidence in the previous comparison. Moreover, further controls may advantageously be provided, which produce in the sequence control a signal indicating coincidence during a control period, in the event of coincidence in any of the practicable comparisons and, during a measurement period, only in the event of coincidence in at most three comparisons, in which the sum of the increases is at least approximately equal to the compensating value.

The evaluation unit here proposed may also with advantage be provided with a weight indicator and controls for adjusting this after a measurement period, in the case of coincidence, to the setting of the main counter. The controls for adjusting the weight indicator may comprise gates between the main counter and the weight indicator, which are opened after a measurement period in the case of coincidence, and in addition the controls, on completion of the adjustment of the indicator to the setting of the main counter, may emit a weight-indication terminal signal.

It is desirable for the evaluation unit here proposed to include also a multiplier for multiplying the weight by a factor which is of significance for a further measurement result derived from the weight, as well as controls for carrying out the multiplication after a measurement period in the event of coincidence, in addition to means for the input of the setting of the main counter and the factor, and means for the output of the product. The multiplier might also well emit a terminal signal on completion of the multiplication.

Furthermore, a product indicator may with advantage be provided, as well as controls for adjusting this to the product determined by the multiplier, and gates between the multiplier and the product indicator, which are opened on completion of multiplication, the controls for adjusting the product indicator emitting a product-indication terminal signal on completion of the adjustment of the indicator to the product ascertained.

The factor to be put into the multiplier may be, for example, an adjustable unit price. In that case, a keyboard for setting up the unit price may well be provided, as well as a unit-price indicator and a control for setting it to the unit price set up by the keyboard, the control for adjusting the unit-price indicator emitting a unit-price-indicator terminal signal on completion of the adjustment of the indicator to the unit price.

The weight-indication terminal signal, the product-indication terminal signal and the unit-price-indicator terminal signal should preferably constitute the input magnitudes of an AND circuit element, which emits an end-of-indication signal on arrival of all three signals.

There is particular advantage in equipping the evaluation unit here proposed with a sequence switch to determine the operating condition of the unit (measuring condition or control condition), with one outlet for each operating condition, which can be adjusted by controls to test the sequence counter and the coincidence circuit and, according to how it is adjusted, delivers via the outlet concerned the signals for the gates that have to be opened during the operating condition selected. The sequence switch may then take the form of a step-on switch, to which the controls for testing the coincidence circuit supply the release signal for stepping-on and the controls for testing the sequence switch supply the switching signal for stepping-on; the controls for testing the coincidence circuit provide a release signal in the event of coincidence in a measurement period or non-coincidence in a control period, but do not give any release signal for non-coincidence in a measurement period or coincidence in a control period; and the signals for identifying the period running at any given moment or the operating condition selected at any given moment are supplied from the sequence switch via the outlets concerned. As a step-on switch, the sequence switch may with advantage comprise an electronic counter, the number of counting positions of which corresponds to the number of operating conditions, with one outlet for each counting position, which counter can be further switched via an AND circuit element, one input of which is connected to the controls for testing the coincidence circuit and the other to the controls for testing the sequence counter.

The rising slope of the step-on switching signal of the sequence switch should preferably be synchronised with the rising slope of the first impulse of the first pulse train after arrival of the terminal signal. Moreover, the clearing signal for the counters may be derived from the switching signal, the rising slope of this clearing signal being synchronised with the rising slope of the first impulse of the second pulse train on completion of that impulse of the first pulse train which initiates the switching signal. Furthermore, the down slope of the switching signal may well be synchronised with the rising slope of the first impulse of the first pulse train after the rising slope of the clearing signal, and the down slope of the clearing signal with the rising slope of the first impulse of the second pulse train after the down slope of the switching signal.

The sequence switch should preferably be adjustable to the three operating conditions of control, measurement and indication. In that case, the evaluation unit here proposed may advantageously also be so designed that the sequence switch has three switching positions (control, measurement and indication), which can be switched-in in continuous succession; in the indication position, it supplies the opening signal via the outlet concerned to the gate circuit between the main counter and the weight indicator, and at its release-signal input it provides, via an OR circuit element allotted to the controls for testing the coincidence circuit, the step-on release signal; and the weight-indicator terminal signal is fed to an OR circuit element allotted to the controls for testing the sequence switch, initiating the switching signal for stepping on to the control position.

A particularly advantageous arrangement is for the sequence switch to be adjustable to the four operating conditions of control, measurement, multiplication and indication. In that case, the evaluation unit may be so designed that the sequence switch has four switching positions (control, measurement, multiplication and indication), which can be switched-in continuous succession; in the multiplication position, it supplies to the multiplier, via the outlet concerned, the signal for carrying out the multiplication, and at its release-signal input it provides, via a first OR circuit element allotted to the controls for testing the coincidence circuit, the step-on release signal; in the indication position, it supplies the opening signal, via the outlet concerned, to the gates between main counter and weight indicator, between multiplier and product-indicator and between keyboard and unit-price indicator, and at its release-signal input it provides, via the first OR circuit element, the step-on release signal; a multiplier terminal signal is supplied, on completion of multiplication, to a second OR circuit element allotted to the controls for testing the sequence counter and sends the switching signal for stepping on to the indication position; and the indication terminal signal is likewise fed to the second OR circuit element and initiates the switching signal for stepping-on to the control position. With an evaluation unit of this kind, the auxiliary counter can be used to particular advantage as a multiplier store during the multiplication period.

The invention is explained in greater detail hereunder with the aid of two practical examples, in conjunction with the accompanying drawings, in which.

Figure 1:
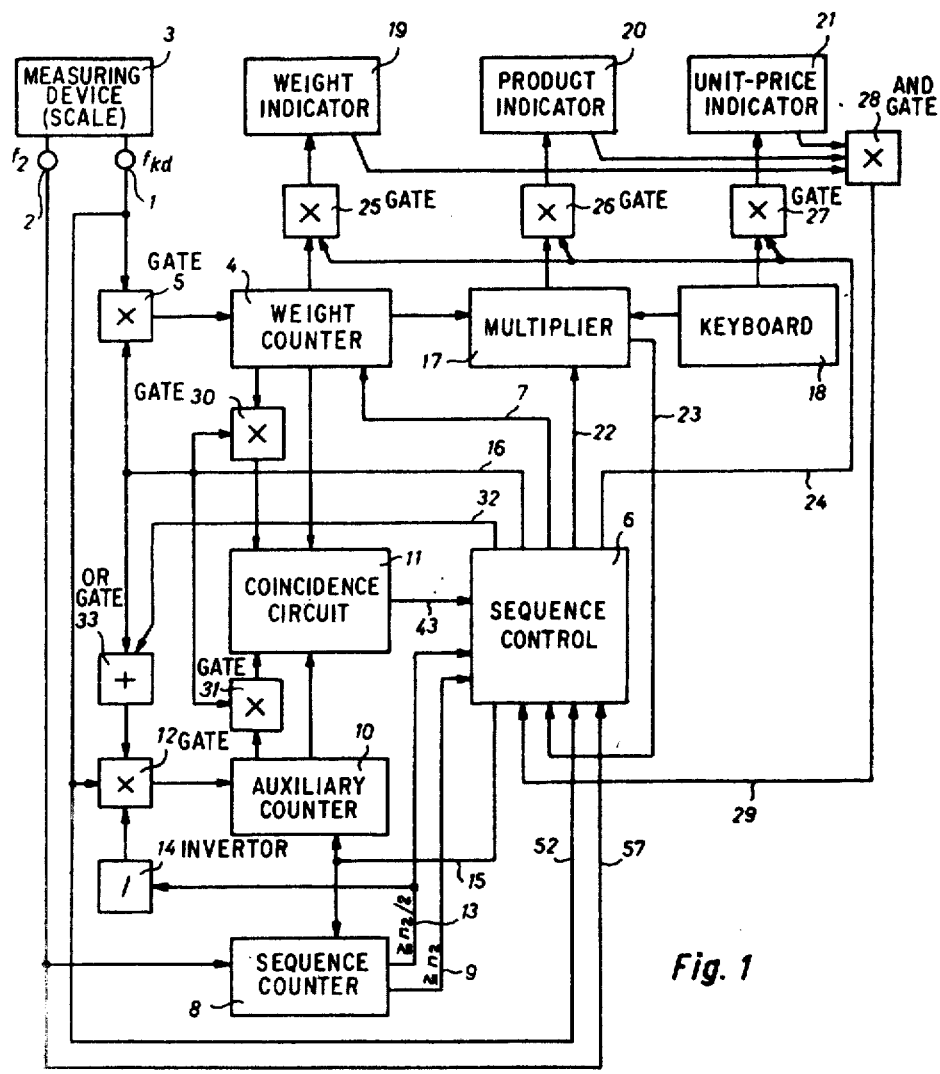
FIGURE 1 is a block diagram of an evaluation unit conforming to the invention.
Figure 2:
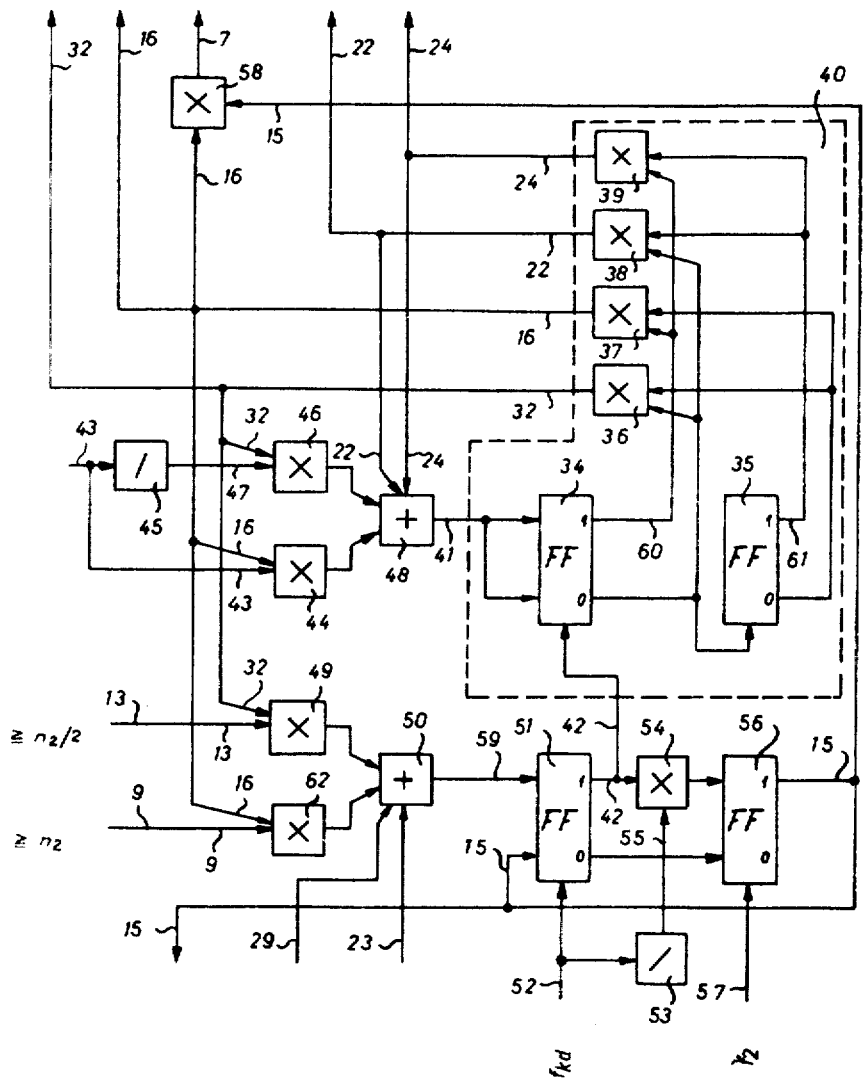
FIGURE 2 is a block diagram of sequence control 6 of the evaluation unit shown in FIGURE 1.
Figure 3:
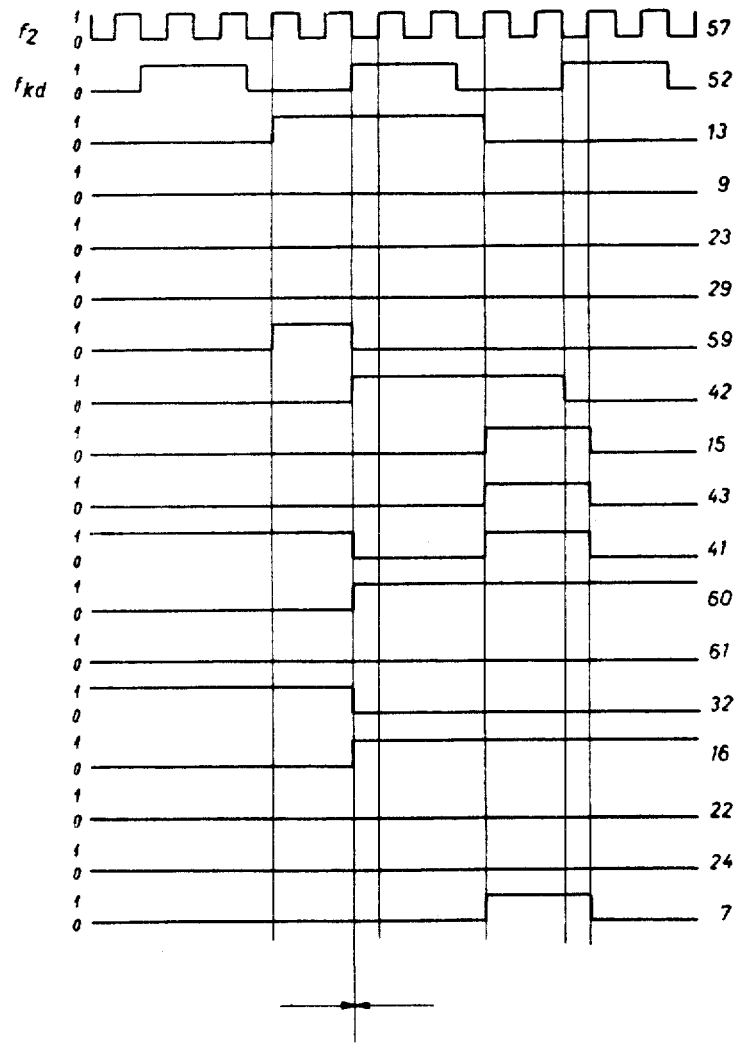
Figure 4:
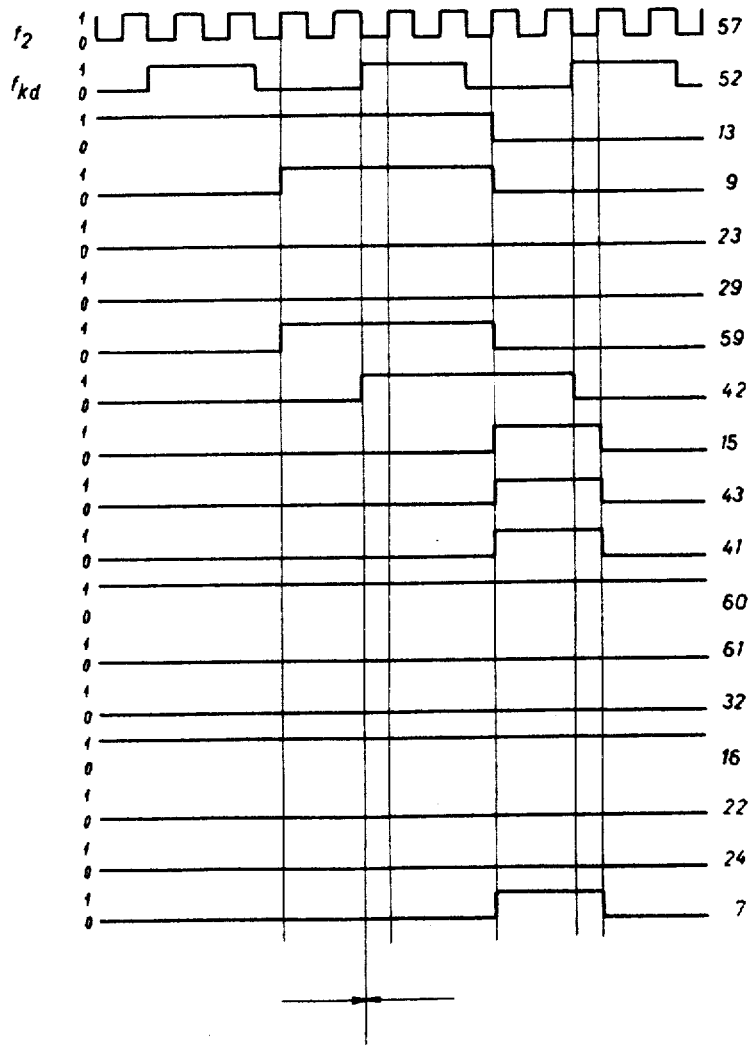
Figure 5:
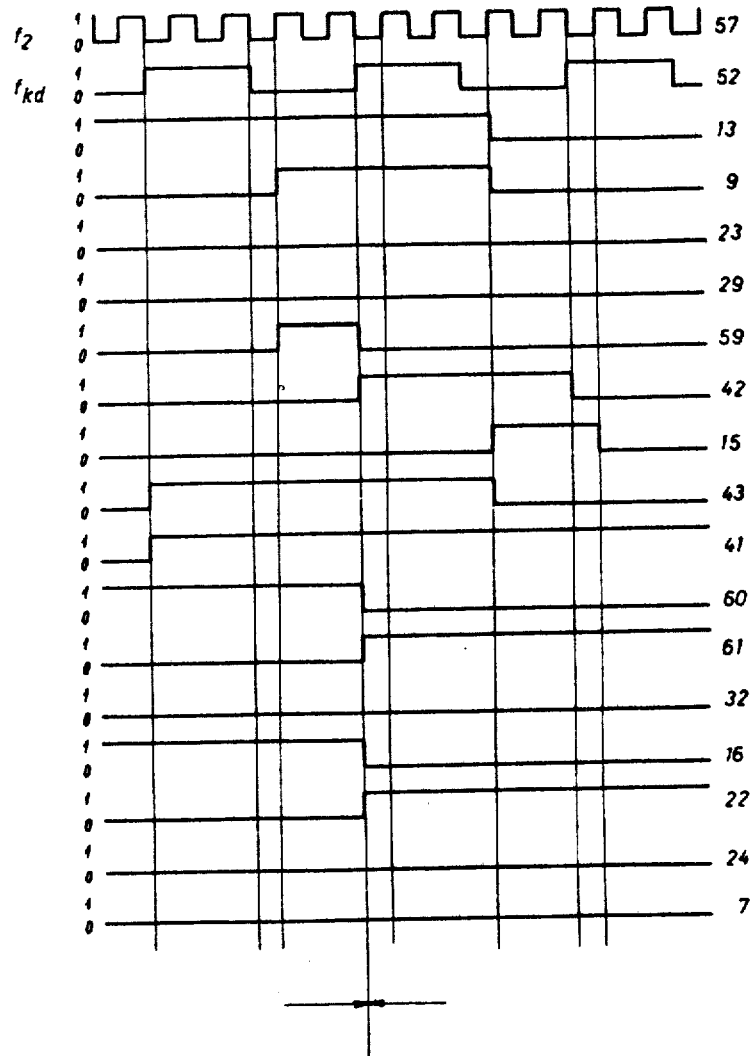
Figure 6:
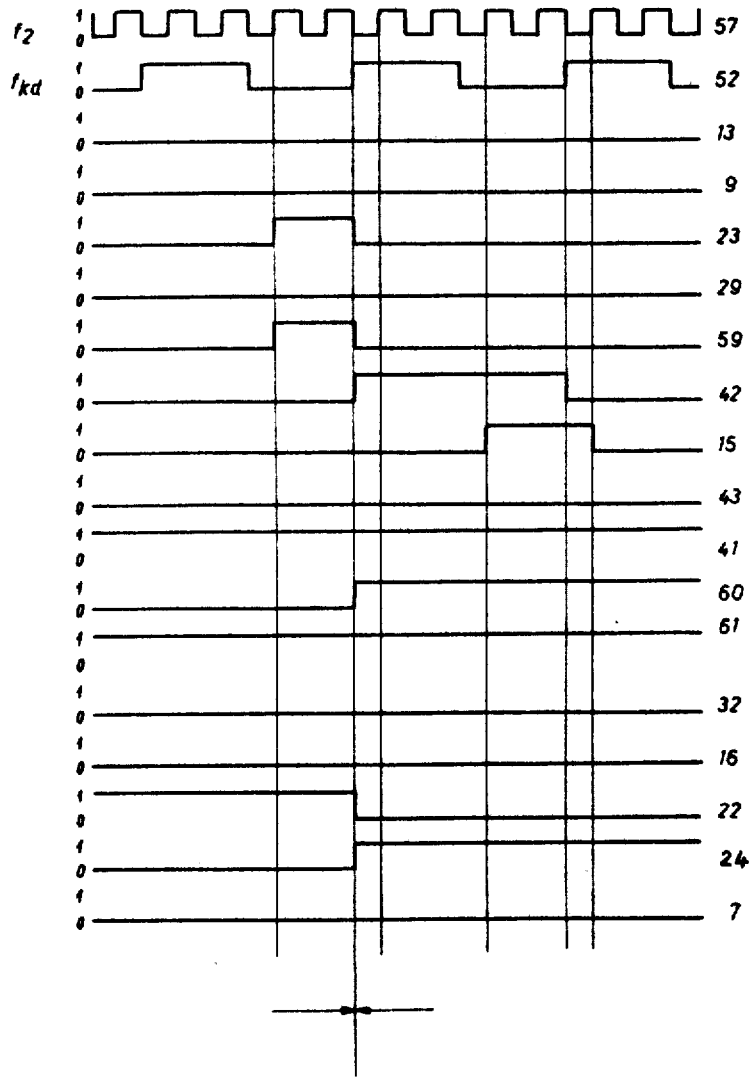
Figure 7:
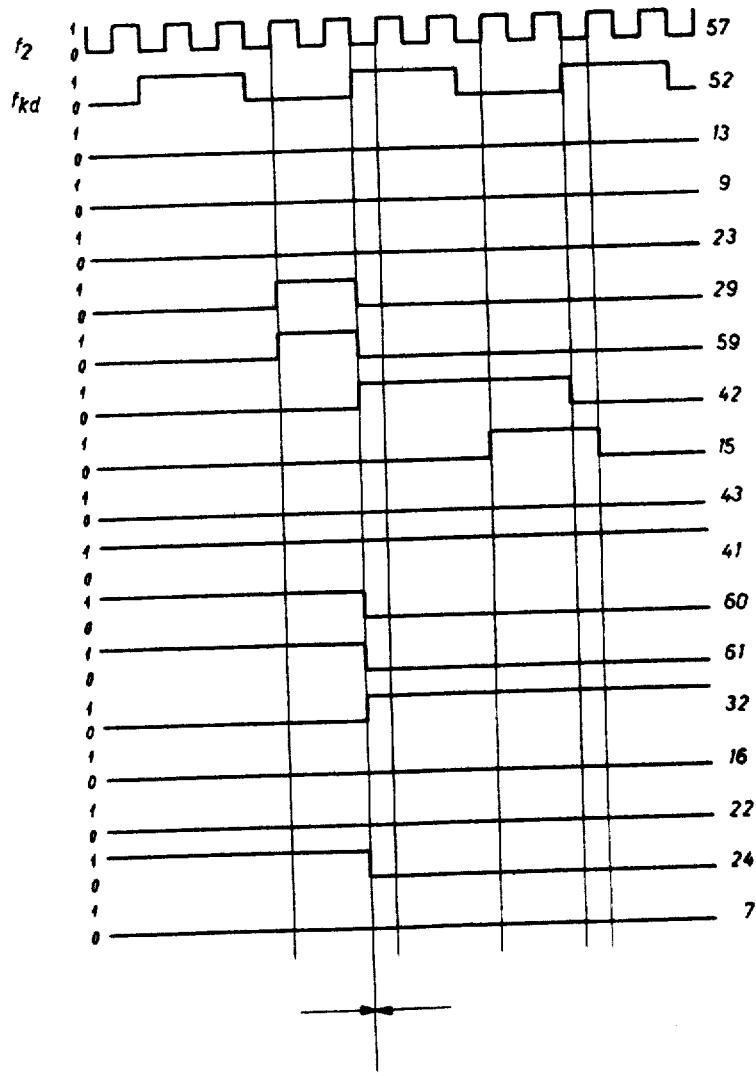
Figure 8:
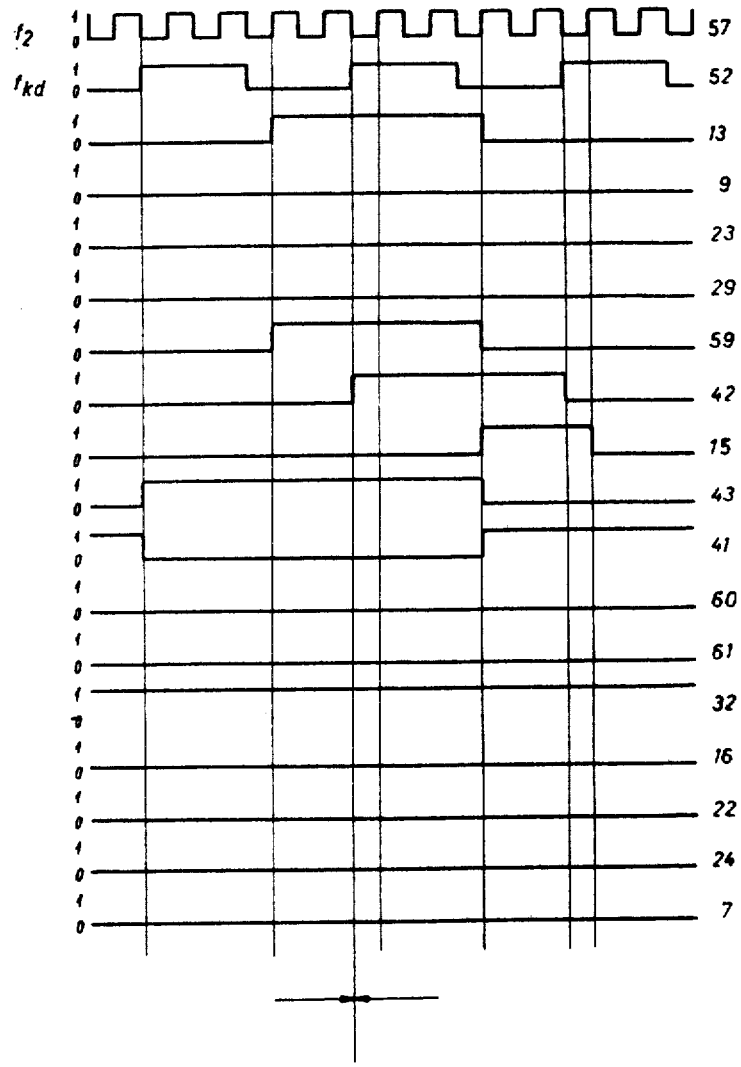
Figure 9:
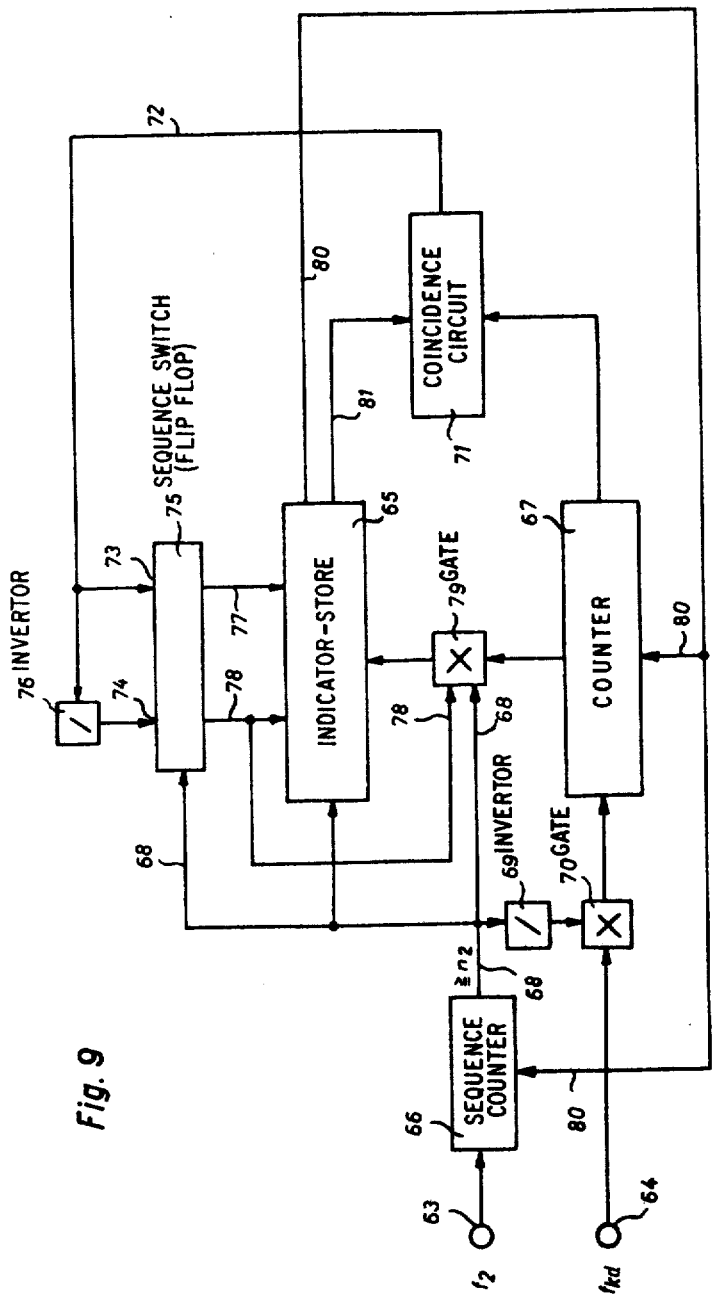

FIGURES 3 to 8 show the timing of the signals in wires 7, 9, 13, 15, 16, 22, 23, 24, 29, 32, 41, 42, 43, 52, 57, 59, 60 and 61 of the evaluation unit shown in FIGURES 1 and 2 at the change-over between two periods, FIGURE 3 showing the change-over from control to measurement period, FIGURE 4 from measurement to measurement period, FIGURE 5 from measurement to multiplication period, FIGURE 6 from multiplication to indication period, FIGURE 7 from indication to control period and FIGURE 8 from control to control period; and FIGURE 9 is a block diagram of another evaluation unit conforming to the invention.

In FIGURE 1, string balance 3, which constitutes the measuring device, is connected to the two inputs, 1 and 2, of the evaluation unit conforming to the invention, and supplies, by way of output magnitudes, two pulse trains of variable pulse frequency, from which the weight imposed on the balance can be determined.

The two pulse trains are derived from the resonance vibrations of two pre-stressed strings, the tension on which is influenced by the weight imposed on the balance, which increases the tension on one string and reduces it on the other. When the weight is increased, therefore, the resonance frequency $f_1$ of the first string rises and the resonance frequency $f_2$ of the second string falls.

The design of the string balance is such that the ratio of the frequency difference $f_d$ (that is to say $f_1 - f_2$) between the resonance frequencies of the two strings to the resonance frequency $f_2$ of the second string is proportional to the imposed weight G. Basically, therefore, the equation $$G = C \frac{f_1 - f_2}{f_2}$$

holds good for the string balance, C being a proportionality constant in the form of a weight dimension. It follows, of course, that the ratio of the frequency of the $k^{th}$ harmonic of the differential vibration, or $$f_{kd} = k \cdot f_d = k(f_1 - f_2)$$

to resonance frequency $f_2$ is likewise proportional to the imposed weight G, so that the above equation can be written in a more general form as $$G = \frac{C}{k} \cdot \frac{k(f_1 - f_2)}{f_2} = \frac{C}{k} \cdot \frac{f_{kd}}{f_2}$$

Differential frequency $f_d$ is obtained by conventional means of mixing the two resonance vibrations, and harmonics of the differential vibration can either be derived directly from the mixing stage by rectifying the differential vibration and filtering out the desired harmonics, or produced by frequency multiplication.

For the weighing range of the string balance to extend from zero to a given maximum, $G_{max}$, then, according to the above equation, it would have to be possible to produce from the mixing stage differential frequencies of from $f_{kd_0} = 0$ up to a maximum frequency of $f_{kd_{max}}$. In that case, the mixing stage and all corresponding amplification stages would have to have a relative bandwith $b$ equal to $f_{kd_{max}}/f_{kd_0} = f_{kd_{max}}/0 = \infty$, which is infinite. To avoid the difficulties resulting from this, the string balance is loaded with a basic load $G_0$ or the basic pre-stressing of the strings is made such that when weight G is zero, there is a corresponding difference between the two resonance frequencies $f_{1_0}$ and $f_{2_0}$. In the latter case, the equivalent basic load is $$G_0 = \frac{C}{k} \cdot \frac{k(f_{1_0} - f_{2_0})}{f_{2_0}} = \frac{C}{k} \cdot \frac{f_{kd_0}}{f_{2_0}}$$

The two pulse trains already mentioned, which the string balance produces as output magnitudes, are the trains having pulse frequencies of $f_{kd}$ and $f_2$. These two frequencies define the weight G imposed on the string balance, in accordance with the above explanation, by the relationship $$G = \frac{C}{k} \cdot \frac{f_{kd}}{f_2} - G_0$$

To enable weight G to be determined as accurately as possible from these output magnitudes, the frequencies must be measured as accurately as possible. With the evaluation unit here proposed, this has been achieved in principle by the conventional method of counting the impulses falling within a given period of time. Thus, during a period of one second, for instance, the number counted would be precisely equal to the pulse frequency in cycles per second.

In the present case, however, a given fixed period of time is not necessary, since, to determine the weight from the above formula, what has to be determined is not the two separate frequencies $f_{kd}$ and $f_2$, but only the quotient of $f_{kd}/f_2$; for, as pulse frequency $f = n/T$ is in general equal to the number of impulses $n$ per unit of time T, if the periods $T_{kd}$ and $T_2$ for counting the impulses of pulse frequency $f_{kd}$ and $f_2$ are equal, the time cancels out from the quotient expressed as $$f_{kd}/f_2 = \frac{n_{kd}}{T_{kd}} \bigg/ \frac{n_2}{T_2} = \frac{n_{kd}}{n_2} \cdot \frac{T_2}{T_{kd}}$$

When the counting of the impulses commences and ceases at the same time for both pulse trains, therefore, weight G is independent of the duration of counting:

$$G = \frac{C}{k} \cdot \frac{n_{kd}}{n_2} - G_0$$

or, as a numerical equation:

$$\frac{G}{G^*} = \frac{C}{k \cdot G^*} \cdot \frac{n_{kd}}{n_2} - \frac{G_0}{G^*}$$

$n_{kd}$ being the number of impulses of pulse frequency $f_{kd}$ and $n_2$ the number of impulses of pulse frequency $f_2$ from the beginning to end of counting, while $G^*$ represents the chosen weight unit (e.g. $G^* = 1$ gr.).

In view of the independence of the measurement result from the duration of count, therefore, the end of the count can be deferred each time until the number $n_2$ of impulses of pulse frequency $f_2$ counted has reached a given fixed value. Then, it is true, the duration of count $t_2 = n_2/f_2$, and hence the time required for determining the measurement result, will vary with pulse frequency $f_2$, but, in return, given a suitable choice for $n_2$, such that $C/(k.C^*.n_2) = 1$, the measurement result is reduced to the very simple form $$\frac{G}{G^*} = n_{kd} - \frac{G_0}{G^*}$$

Bearing in mind, moreover, that the number $n_{kd}$ of impulses of pulse frequency $f_{kd}$ counted is equal to the end-of-count reading $z$ less the start-of-count reading $z_0$, or $n_{kd} = z - z_0$, so that $$\frac{G}{G^*} = (z - z_0) - \frac{G_0}{G^*} = z - \left(z_0 + \frac{G_0}{G^*}\right)$$

a suitable choice for the start-of-count reading $z_0$, such that $$z_0 = -\frac{G_0}{G^*}$$

enables the constant term in the above equation also to be offset and the weight to be ascertained is given in weight units $G^*$, e.g. in grammes, directly from the final reading $z$ of the counter to which the pulse train having the pulse frequency $f_{kd}$ is fed (and which will be referred to from now on as the "weight counter"), thus:

$$\frac{G}{G^*} = z$$

To achieve this result, the evaluation unit must comply with the assumptions and conditions made in arriving at the relationship $G/G^* = z$.

Accordingly, the evaluation unit has retaining means, here a weight counter 4, which is connected to input 1 via gate 5. The pulse train having the pulse frequency $f_{kd}$ is fed from string balance 3 to input 1. In accordance with the requirement already laid down, before each weight measurement, weight counter 4 is set to the reading $z_0$:

$$z_0 = -\frac{G_0}{G^*} = -\frac{C}{kG^*} \cdot \frac{f_{kd_0}}{f_{2_0}}$$

which takes account of the basic value or basic load $G_0$, by means of a clearing impulse supplied by sequence control 6 via signal wire 7.

Weight counter 4 counts (stores) those impulses of pulse frequency $f_{kd}$ which occur within one measurement time. The duration $T_{kd}$ of this measurement time is determined by sequence counter 8. The sequence counter starts counting at the same time as the weight counter and counts the impulses of pulse frequency $f_2$ fed to it from the string balance via input 2. When a given number $n_2$ of these impulses has been counted, sequence counter 8 emits, via signal wire 9 to sequence control 6, a signal whereby the measurement period is ended.

The number $n_2$ of impulses having the pulse frequency $f_2$ to be counted each time by sequence counter 8 is given by the foregoing condition $C/(k.G^*.n_2) = 1$, being namely $$n_2 = \frac{C}{kG^*}$$

Information as to the duration of measurement can be derived from this formula. The duration of measurement is of material importance, inasmuch as the permissible interval between the application of the weight and the indication of the measurement result is generally limited.

One statement to be derived from the above formula is that the smaller the chosen weight unit $G^*$, that is to say the more accurately the weight is to be determined, the greater is the number $n_2$ of impulses to be counted and hence the greater likewise is the duration of measurement. In practice, however, the unit of weight of a balance is generally fixed in advance, so that there is no possibility in that direction of reducing the duration of measurement; nor does the constant C pre-determined by the balance offer any possibility of reducing the duration of measurement, even if one considers modifications in the design of the balance; that is because, when C is reduced, differential frequency $f_d$ must be correspondingly greater to define a given weight, and the measurement curve $G = C.f_d/f_2$ is almost linear over only a limited portion, so that, with excessively high differential frequencies, inaccuracies in measurement arise as a result of nonlinearity of the measurement curve.

Some limited reduction of the duration of measurement can be achieved, on the other hand, by the choice of a suitable value for $k$. This can be seen from consideration of the formula from which the above relationship for $n_2$ is derived:

$$G = \frac{C}{k} \cdot \frac{n_{kd}}{n_2} - G_0$$

The formula states that the measurement result, that is to say weight G, when the ratio between the number $n_{kd}$ of impulses counted by the weight counter and the number $n_2$ of the impulses counted by the sequence counter remains the same, is independent of the absolute number $n_2$ or $n_{kd}$ of impulses counted. This statement, however, takes no account of the statistical inaccuracy of measurement. The fewer the pulses counted, the greater this undoubtedly is, since 1 missed impulse in 100 counted impulses, for example, represents an error of 1 percent, whereas, based on an impulse count of 1,000, the error is only 1 per mil. The statistical inaccuracy of measurement is therefore substantially determined by the pulse train with the lower pulse frequency, which provides the smaller number of impulses $n_{kd}$ or $n_2$. If both numbers of impulses $n_{kd}$ and $n_2$ are approximately equal, they will both contribute equally to the statistical inaccuracy of measurement. It is thus possible to arrive at an optimum result as regards the greatest possible accuracy of measurement and the shortest possible period of measurement.

It is accordingly preferably to make $k$ such that $n_2$ is approximately equal to the mean value of $n_{kd}$ within the range of measurement. In that case, for $k$ we get:

$$k \approx \frac{C}{\sqrt{G_0 + G_{max}/2}}$$

The corresponding $k^{th}$ harmonic may then with advantage be filtered directly from the mixing stage in the string balance and fed to input 1 of the evaluation unit.

At the end of the measurement period, after the counting of $n_2$ impulses of pulse frequency $f_2$ by sequence counter 8, measurement value $z$ of the weight G imposed on string balance 3 is available in weight counter 4.

This measurement value $z$, however, may differ from the actual value of the weight, $G/G^*$, owing to various possibilities of error. Of these, the chief possibility lies in the nature of the weighing process itself; for every balance, when a weight is put on, initially carries out a transient process. This transient process, it is true, is very brief with the string balance, but if the weight counter should start counting during this transient time, the measurement value may be falsified by frequencies $f_1$ and $f_2$ still being faulty during the transient process.

To enable such incorrect measurements to be recognized and to prevent their being indicated, the evaluation unit is provided with storage means, here auxiliary counter 10, and a coincidence circuit 11.

Auxiliary counter 10 operates on the same principle as weight counter 4, that is to say that it too starts counting (storing) simultaneously with the weight counter and sequence counter and, like the weight counter, counts those impulses of pulse frequency $f_{kd}$ which are fed to it from input 1 via gate 12, but with this difference, that the auxiliary counter steps two units forward for every input impulse. Thus, the auxiliary counter has already arrived at a comparison value corresponding to measurement value z on completion of the first half of the measurement time, at which point it is stopped by a signal emitted by sequence counter 8 from count position $n_2/2$ via signal wire 13 to invertor 14, which signal interrupts the switch-through signal given by invertor 14 to gate 12.

Now, this comparison value arrived at by auxiliary counter 10 during the first half of the measurement time will agree with measurement value z arrived at by weight counter 4 during the full measurement time, only if the balance has been at reast throughout the measurement time. In all other cases—and in particular if a transient process should occur during the start of the measurement time or if the state of rest of the balance should be otherwise disturbed, by, for example, shocks—there will be no agreement between the measurement and comparison values. It would be theoretically possible, of course, to have agreement where deviations arise in the comparison value during the comparison time, in that, during the period between the end of the comparison time and the end of the measurement time, further deviations might arise and by coincidence produce an equalizing effect, but the probability of such coincidence is so small that it can be ignored in practice.

Instead of the subdivision just described into measurement and comparison times, in which the comparison time is approximately equal to the first half of a measurement period and the measurement time is approximately equal to the full measurement period, other subdivisions are naturally also possible, such that, for example, the comparison time is equal to the first half and the measurement time is equal to the second half of the measurement period. In the latter case, however, given the same length of periods, the measurement time—and hence, as can be seen from what has been stated above in connection with the choice of $k$, the accuracy of measurement—is only half as great as in the former case. The latter subdivision should therefore be resorted to only when there is a wide enough margin, in the light of the required accuracy of measurement, or when the length of period is still far enough below its permissible value to enable the requisite accuracy of measurement to be achieved by an appropriate lengthening of the period. When these conditions are satisfied, one can proceed a step further and use one and the same counter for determining the measurement and the comparison value. In that case, though, one must have a store available, into which the value found initially can be put, for comparison with the second value when this has been found. This possibility is dealt with later in greater detail in conjunction with FIGURE 9.

By a comparison of the measurement value z ascertained by the weight counter with the comparison value ascertained by the auxiliary counter, one can thus determine, in accordance with what has already been stated, whether the balance was at rest during the measurement and comparison times; and, since the position of rest of a balance (assuming this to have been correctly calibrated, of course) is a fairly reliable criterion for the accuracy of weighing, it is possible, with the aid of comparison, to determine the accuracy of weighing by checking whether the balance has been in a state of rest during weighing.

Coincidence circuit 11 serves for carrying out the comparison between the measurement value determined by the weight counter and the comparison value determined by the auxiliary counter. This circuit, however, can only check whether the even number forming the final reading of the auxiliary counter, which counts in two-unit steps, agrees with the last even number forming the final reading of the weight counter, since otherwise, for every uneven number forming the final reading of the weight counter, comparison would show lack of agreement, notwithstanding accurate weighing. In the present case, this is realized basically, with electronic counters 4 and 10, which are built up from binary stages, by virtue of the fact that the condition of the first binary stage of the weight and auxiliary counters in each instance are not brought into the comparison.

Coincidence circuit 11 thus ascertains only whether the even portion of the measurement value agrees with the comparison value, while the odd portion of the measurement value, which may amount to $+1$ or $-1$ counting unit, remains unchecked.

In the event of non-agreement (non-coincidence) when comparison is made, the measurement period is repeated until agreement is found.

Coincidence circuit 11 in this case supplies no coincidence signal to sequence control 6, and this, in the absence of a coincidence signal, on receipt of the signal coming in over signal wire 9 and indicating the end of the measurement time, brings about, by means of a clearing signal over wires 7 and 15, the clearance of the weight, auxiliary and sequence counters or the return of the weight and auxiliary counters to the negative setting corresponding to basic load $G_0$ and the return of the sequence counter to zero and holds gate 5, which precedes the weight-counter input, open by maintaining a switch-through signal fed to signal wire 16. Gate 12, preceding the auxiliary counter, is opened upon the clearance of sequence counter 8, because the setting of the latter then lies once more below $n_2/2$ and hence it emits no signal to signal wire 13, so that invertor 14 can send a switch-through signal to gate 12. On completion of the clearing signals, the weight, auxiliary and sequence counters start counting and a fresh measurement period is carried out in the manner already described.

If, on the contrary, coincidence circuit finds agreement (coincidence) when the measurement value is compared with the comparison value, thus confirming the accuracy of weighting, the measurement value, then the weight ascertained, is firstly multiplied in multiplier 17 by the unit price of the goods placed on string balance 3, as fed into keyboard 18, and then the weight, price and unit price are indicated by indicators 19, 20 and 21.

In this case, coincidence circuit 11 gives a coincidence signal to sequence control 6, whereupon this, on receipt of the signal coming in over signal wire 9 and indicating the end of the measurement time, interrupts the switch-through signal passed to signal wire 16 and closes gate 5, thereby stopping weight counter 4, and, by a clearing signal over wire 15, clears the auxiliary and sequence counters. Simultaneously, sequence control 6 passes to multiplier 17, over signal wire 22, a signal for initiating the multiplication. As soon as multiplier 17 has determined the product of weight z held in weight counter 4 and the unit price of the goods fed into keyboard 18, it passes to sequence control 6, over signal wire 23, a terminal signal indicating the end of multiplication. Sequence control 6, by sending a switch-through signal over signal wire 24 to gates 25, 26 and 27, adjusts weight indicator 19 to the weight z held in the weight counter, adjusts price indicator 20 to the price of the goods held in multiplier 17 and adjusts the unit-price indicator to the unit price of the goods held in keyboard 18. As soon as the adjustment is completed, each of the indicators 19, 20 and 21 gives a signal indicating completion of adjustment to AND circuit element 28 and as soon as the signals from all three indicators have been received, AND circuit element 28 passes an end-of-indication signal to sequence control 6 over wire 29.

Once the end-of-indication signal has been received, sequence control 6 of the evaluation unit being described switches over to the control of the measurement value held in the weight counter. This control will be explained in detail later. This division of the operating sequence is not absolutely essential. Given coincidence, the control can start up immediately after the measurement period, multiplication and indication then taking place in parallel with control, as regards timing. The advantage of the operating sequence chosen for the unit now being described, however, is that the auxiliary counter can be used during multiplication as a multiplier store, which helps to reduce the technical complication of the evaluation unit.

With auxiliary counter 10, which is provided in any case for ascertaining the accuracy of weighing and confirming the state of rest of the balance while weighing, once the measurement value has been determined, a constant check can be kept on the measurement value held (retained) in the weight counter for agreement with comparison values determined in continuous succession. Thus, the measurement value determined can be checked throughout the time during which the weight lies on the balance. This check or control is carried out in this way, that auxiliary counter 10, during control periods, determines a fresh comparison value during one comparison time per control period, in the same way as during the comparison time during the measurement period described above, these comparison values being compared by coincidence circuit 11 with the measurement value held in the weight counter. If comparison shows coincidence, a fresh control period is initiated and a fresh comparison value determined. In the event of non-coincidence, however, control is broken off and a fresh measurement made.

The advantage of this constant check is that not only a false measurement result and hence an incorrectly indicated weight can be at once recognized and corrected, but also any alteration in the weight during weighing. Another great advantage of constant checking is the automatic return of the balance after removal of the weight; for, upon the weight being taken off, the check reveals non-coincidence between the comparison value and the measurement value held in the weight counter, whereupon a fresh measurement is made, which now produces weight 0. The weight indication is thus automatically returned to zero upon removal of the weight.

The only circumstances in which this constant check may have an undesirable effect is when the range of tolerance about the measurement value, within which the comparison value must lie to produce a coincidence signal, is too small. In that case, the indication may be unsteady, for example, because of slight shocks undergone by the balance, with which one must always reckon when the weight is in position for any lengthy period. During the control period in which they occur, these shocks cause a slight alteration in the comparison value, which, where the range of tolerance is too small, may bring about a fresh measurement and so cause the indication to be unsteady.

It is therefore advisable for the range of tolerance within which coincidence is indicated to be made larger for comparison during control periods than for comparison during measurement periods. In the instrument used here as an example, this is achieved by ensuring that the positions of the second binary stages of weight counter 4 and auxiliary counter 10 respectively are brought into the comparison only during measurement periods, and not during control periods. To ensure this, gates 30 and 31, which are opened by the signal impressed on signal wire 16 only during measurement periods, but which remain closed during control periods, are inserted in the wires connecting the second binary stages of the weight counter and auxiliary counter to coincidence circuit 11.

Instead of this, however, the purpose can be served by the provision of controls which, at the end of a period, carry out an initial comparison between the count of the auxiliary counter and that of the main counter, a second comparison between the count (increased by two counting units) of the auxiliary counter and that of the main counter and a third comparison between the count (increased by four counting units) of the auxiliary counter and that of the main counter, and which also, by means of the clearing impulse, set the auxiliary counter, before the period, to a setting which is lower by a compensating value of two or three counting units than the setting of the main counter brought about by a clearing impulse supplied to that counter. Controls may then also be provided, which carry out the second and third comparisons only in the event of non-coincidence in the comparison preceding each and which pass a coincidence signal to the sequence control, during a control period, when one of the three comparison possibilities shows coincidence or, during a measurement period, only when the second comparison possibility shows coincidence.

The control period is initiated by the sequence control, the end-of-indication signal having been received, by the giving of a switch-through signal by the sequence control, over signal wire 32 and the OR circuit element 33, to gate 12, which is interposed in the input to auxiliary counter 10. At the same time, sequence counter 8 and auxiliary counter 10 receive a clearing signal over signal wire 15, which sets the sequence counter to zero. Auxiliary counter 10 has already been cleared or set to a negative setting corresponding to basic load $G_0$ at the end of the previous measurement period. On completion of the clearing signal, sequence counter 8 starts counting the impulses of pulse frequency $f_2$ fed to it via input 2 and auxiliary counter 10 starts counting the impulses of pulse frequency $f_{kd}$ fed to it via input 1 and gate 12. The auxiliary counter here counts, as during the measurement period, in steps of two units per input impulse and has arrived at a comparison value corresponding to the measurement value $z$ in the weight counter by the time the sequence counter has reached the count $n_2/2$. At that point, the auxiliary counter is stopped by the signal already mentioned during the explanation of the measurement period, which signal is passed by sequence counter 8 from count position $n_2/2$ via signal wire 13 to invertor 14 and brings about the interruption of the switch-through signal given by invertor 14 to gate 12.

If, now, the comparison value agrees with the measurement value $z$ in weight counter 4 within the range of tolerance in which the first binary stages of both the auxiliary counter and weight counter are not brought into the comparison, coincidence circuit 11 passes a coincidence signal to sequence control 6, causing the next control period to be carried out.

In that case, after receiving over signal wire 13 the signal indicating the end of the comparison time, sequence control 6, by means of a clearing signal over wire 15, clears the auxiliary and sequence counters, returning auxiliary counter 10 to a negative setting corresponding to a basic load $G_0$ and returning sequence counter 8 to zero, and maintains the switch-through signal passed to gate 12 by way of wire 32 and the OR circuit element 33. On completion of the clearing signal, the auxiliary and sequence counters begin to count and a fresh control period is carried out in the manner already described.

If, however, within the given range of tolerance, the comparison value does not agree with the measurement value $z$ in weight counter 4, the coincidence circuit gives no coincidence signal to sequence control 6 and in that case the sequence control causes a fresh measurement period to be carried out.

For this purpose, in the absence of the coincidence signal, sequence control 6, on receipt of the signal coming in over signal wire 13 and indicating the end of comparison time, passes clearing signals over wires 7 and 15 to the weight, auxiliary and sequence counters, these signals returning the weight and auxiliary counters to negative settings equivalent to basic load $G_0$ and returning the sequence counter to zero. Sequence control 6 also causes the switch-through signal impressed on signal wire 32 to be interrupted and impresses a fresh switch-through signal on signal wire 16, which opens gate 5, inserted in the input lead of the weight counter, and supplies to gate 12 one of the two necessary switch-through criteria by way of the OR circuit element 33. The other switch-through criterion is supplied, on clearance of sequence counter 8, by invertor 14, which, as soon as the setting of the sequence counter is once more below $n_2/2$, no longer receives any input signal over signal wire 13. On completion of the clearing signals, the weight, auxiliary and sequence counters start to count and a fresh measurement period is carried out in the manner already described.

The various components of the unit, represented as blocks in FIGURE 1, are made up as follows:

The inside of weight counter 4 is like that of the electronic counters generally familiar in digital technique, with setting leads for adjusting the setting at the commencement of counting, one output lead per binary stage for putting out the reading at any given moment and one input lead for the impulses to be counted in the first binary stage, and the counter need not therefore be explained in greater detail here. Of the setting leads, those which, when a signal is given, bring about the adjustment of the counter to a negative setting corresponding to the basic load $G_0$ are connected to signal wire 7, which carries the clearing impulse. The output leads are connected, in the first place, through an appropriate number of gates, symbolized in FIGURE 1 by gate 25, to weight indicator 19 and, in the second place, to the appropriate inputs of multiplier 17. In addition, the output leads of all the binary components to be compared, except for the first one, are connected directly to the appropriate inputs of coincidence circuit 11. The output of the first binary component to be compared is connected through gate 30 to the appropriate input of the coincidence circuit. The input lead for the count impulses is connected to the output of gate 5.

The interior of auxiliary counter 10 likewise correponds, as does also that of weight counter 4, to the electronic counters generally familiar in digital technique, with setting leads for adjusting the setting at the commencement of counting, one output lead per binary stage for putting out the reading at any given moment and one input lead for the count impulses, and hence need not be described in detail here, either. Of the setting leads, those which, when a signal is given, bring about the adjustment of the counter to a negative setting corresponding to the basic load $G_0$ are connected to signal wire 15, which carries the clearing impulse. The output leads of all the binary components to be compared, except for the first one, are connected directly to the appropriate inputs of coincidence circuit 11. The output of the first binary component to be compared is connected to the appropriate input of the coincidence circuit through gate 31. The input lead for the count impulses is connected to the output of gate 12 and joined within auxiliary counter 10 to the binary stage allotted to the second binary component (with the value 0 or 1 times $2'$).

As with the auxiliary and weight counters, sequence counter 8 also corresponds to the electronic counters generally familiar in digital technique, with setting leads for adjustment of the counter at the commencement of counting, an input lead for the count impulses at the first binary stage and at least two output leads, the first of which is connected to the counting stage operative from counter position $n_2/2$ and the second is connected to the counting stage operative from counter position $n_2$. Of the setting leads, those which, when a signal is given, bring about the adjustment of the counter to zero are connected to signal wire 15, which carries the clearing impulse. The input lead for the count impulses is connected to input 2 of the evaluation unit. The first output lead already mentioned is connected to signal wire 13 and the second output lead already mentioned is connected to signal wire 9.

The interior of coincidence circuit 11 corresponds to the coincidence circuits generally familiar in digital technique, with one pair of coincidence inputs to each binary figure to be compared and an output for putting out the coincidence signals, and it need not, therefore, be explained in detail here. The coincidence inputs are connected, as already mentioned in connection with the interior of the auxiliary and weight counters, to the appropriate outputs of the auxiliary and weight counters. The output of the coincidence circuit is connected to signal wire 43.

The interior of multiplier 17, similarly, corresponds to the multipliers generally familiar in digital technique, with two groups of inputs for the two factors and one group of outputs for the resulting product, as well as an input for the signal to proceed with multiplication and an output for the emission of a signal when multiplication is complete. One of the groups of inputs is connected, as already mentioned in connection with the interior of the weight counter, to the appropriate outputs of the weight counter, while the other group of inputs is connected to the appropriate outputs from keyboard 18 and the group of outputs is connected via a corresponding number of gates, symbolized in FIGURE 1 by gate 26, to product indicator 20. In addition, the input for the signal to start multiplying is connected to signal wire 22 and the output for emitting an end-of-multiplication signal is connected to signal wire 23.

Keyboard 18 is assembled after the manner of the keyboard of a cash register and contains one contact to each key, which, when the key is pressed, sets up in the appropriate output wires a binary value corresponding to the value of the key. The output wires are connected, on the one hand, as already mentioned, to one group of the factor inputs to multiplier 17 and, on the other hand, via a corresponding number of gates, symbolized in FIGURE 1 by gate 27, to unit-price indicator 21.

The interiors of the indicators 19, 20 and 21 are identical and correspond likewise to the indicators generally familiar in digital technique, with electronically controlled setting mechanisms and a group of inputs, over which the setting signals are passed into the indicators, as well as an output for putting out a signal on completion of setting. The inputs are connected, through a gate in each instance, to the outputs of weight counter 4 (in the case of weight indicator 19), to the outputs of multiplier 17 (in the case of product indicator 20) and to the outputs of keyboard 18 (in the case of unit-price indicator 21). The outputs from the indicators for emitting a signal on completion of setting are connected to the inputs of AND circuit element 28.

The internal construction and mode of operation of sequence control 6 will now be explained, in conjunction with FIGURE 2.

The heart of the sequence control is sequence switch unit 40, which comprises flip-flops 34 and 35 and AND circuit element 36, 37, 38 and 39. Here, the combination of switching elements 34 to 39 constitutes the electronic equivalent of an ordinary step-on switch, which can be stepped on by the giving of a release signal over wire 41 and a switching signal over wire 42 and which passes an output signal to whichever of the outputs (of AND circuit elements 36 to 39) is in circuit. The step-on switch consists of a counter in the form of one of the flip-flops 34 and 35 with four counting positions following one another in closed succession and one AND circuit element (36 to 39) for each counting position, the inputs of which are connected to the operative stages appropriate to the counting position and the output of which constitutes he step-on switch output appropriate to the counting position. Flip-flop 34 is a so-called "J–K" flip-flop, which can be switched over only by a release and switching signal.

By means of sequence switch unit 40, the operating states of "control," "measure," "multiply" and "indicate" can be set up in turn, in closed succession. While no weight lies on the balance, the sequence switch stays in the "control" position and the evaluation unit controls, in a continuous succession of control periods, the weight-value zero measure during a previous measurement period after the removal of a weight from the balance and incicated by weight indicator 19.

If, now, within such a control period, a weight be laid on balance 3, the two pulse frequencies $f_{kd}$ and $f_2$ are altered and auxiliary counter 10, during the remaining portion of the comparison time, arrives at a comparison value greater than zero. As a result, at the end of the comparison time, coincidence circuit 11 gives no coincidence signal to signal wire 43, by which coincidence circuit 11 is connected to sequence control 6.

In the sequence control, signal wire 43 is connected on one side to the input of AND circuit element 44 and on the other side to the input of invertor 45. AND circuit element 44, however, is closed in the "control" position of sequence switch unit 40, because its other input is connected to signal wire 16, which carries a signal only in the "measure" position of sequence switch unit 40.

Since coincidence circuit 11 passes no coincidence signal to invertor 45, the invertor passes an output signal to connecting wire 47, which leads to AND circuit element 46. Furthermore, sequence switch 40, in the "control" position, passes a signal via signal wire 32 to AND circuit element 46. As there are thus signals at both inputs of AND circuit element 46, AND circuit element 46 passes to input wire 41 of sequence switch 40, by way of OR circuit element 48, a step-on release signal.

With the arrival of the signal indicating the end of the comparison time, passed by sequence counter 8 from counter position $n_2/2$ to signal wire 13, there are also signals at both inputs of AND circuit element 49, because the other end of AND circuit element 49 is likewise connected to signal wire 32, which carries a signal from sequence switch 40 when this is in the "control" position. Hence, on receipt of the signal indicating the end of the comparison time, AND circuit element 49 gives J–K flip-flop 51, via OR circuit element 50 and signal wire 59, a signal constituting the terminal signal for the current control period and at the same time the release signal for changing over flip-flop 51. With the rising slope of the next impulse in the train having pulse frequency $f_{kd}$ to arrive via wire 52, flip-flop 51 is now changed over and thereupon passes to input lead 42 of sequence switch 40 the step-on switching signal.

As the step-on release signal is already in input wire 41 of sequence switch 40, the sequence switch is stepped-on by this switching signal to the "measure" position, a measurement period thus being intiated.

As soon as the impulse arriving over wire 52 to change flip-flop 51 over is completed, so that there is no longer any input signal at the input of invertor 53, invertor 53 passes an output signal to AND circuit element 54 over wire 55. There are thus input signals now at both inputs of AND circuit element 54, namely the switching signal given by flip-flop 51 to wire 42 and the output signal from invertor 53. At this moment, therefore, that is to say on completion of the impulse which changes flip-flop 51 over, AND circuit element 54 passes to J–K flip-flop 56 an output signal constituting the release signal for changing over flip-flop 56. With the rising slope of the next impulse in the pulse train having the pulse frequency $f_2$ to arrive via wire 57, flip-flop 56 is changed over, thereupon passing an output signal to signal wire 15.

Since signal wire 15 leads from sequence control 6 to the clearing-pulse inputs of auxiliary counter 10 and sequence counter 8, this output signal from flip-flop 56 to signal wire 15 results in clearing the auxiliary and sequence counters and returns the auxiliary counter to a negative setting equivalent to basic load $G_0$ and the sequence counter to zero.

Signal wire 15 also leads to one input of AND circuit element 58, the other input of which is connected to signal wire 16, which has a signal impressed on it when sequence switch 40 is in the "measure" position. As sequence switch 40 has been stepped on to the "measure" position before the change-over of flip-flop 56, the passing of the output signal from flip-flop 56 to signal wire 15 means that there are input signals at both inputs of AND circuit element 58. AND circuit element 58 therefore emits an output signal at this moment, that is to say when flip-flop 56 changes over.

Since signal wire 7 leads from sequence control 6 to the clearing-signal input of weight counter 4, this output signal from AND circuit element 58 to signal wire 7 results in the weight counter being cleared and returned to a negative setting equivalent to basic load $G_0$, approximately at the same time as the auxiliary and sequence counters are cleared.

Signal wire 15 also leads to the second release input of J–K flip-flop 51. The output signal passed by flip-flop 56 to signal wire 15 thus constitutes at the same time the release signal for returning flip-flop 51. With the rising slope of the next impulse in the train having pulse frequency $f_{kd}$ which follows this output signal and arrives via signal wire 52, therefore, flip-flop 51 is returned and thereupon passes to the second release input of J–K flip-flop 56 an output signal which constitutes the release signal for returning flip-flop 56. With the rising slope of the next impulse in the train having pulse frequency $f_2$ to arrive over signal wire 57, therefore, flip-flop 56 too is now returned. By this return of flip-flop 56, the output signal from flip-flop 56, passed to signal wire 15 and fed as a clearing signal to auxiliary counter 10 and sequence counter 8 and as a switch-through signal to AND circuit element 58, is cut off. As this output signal is cut off, AND circuit element 58 also cuts off the clearing signal passed to weight counter 4 over signal wire 7.

FIGURE 3 provides graphically a clearer general picture of the timing of the various signals in wires 7, 13, 15, 16, 32, 41, 42, 43, 52, 59, 60 and 61, at the change-over from a control period to a measurement period.

When the clearing signals are cut off, the weight, auxiliary and sequence counters begin counting. The requisite opening of gate 5, in front of the weight-counter input, and gate 12, in front of the auxiliary-counter input, has taken place beforehand, gate 5 being opened when sequence switch 40 is stepped to the "measure" position by the switch-through signal passed in this position to signal wire 16 and over this wire to gate 5, while gate 12 is opened upon the clearing of sequence counter 8 by the switch-through signal given to gate 12, on the one hand, by invertor 14 and, on the other hand, by sequence switch 40 via signal wire 16 and OR circuit element 13.

When counting begins, upon the cutting-off of the clearing signals, the measurement and comparison times also begin. The measurement period initiated by the stepping-on of sequence switch 40 is now carried out as already described in detail during the explanation of FIGURE 1. Auxiliary counter 10 is thus stopped by the signal marking the end of the comparison time, which is passed by sequence counter 8 to signal wire 13 when the count position $n_2/2$ is reached, and weight counter 4 runs on until the signal marking the end of the measurement time, which is passed by sequence counter 8 to signal wire 9 when the count position $n_2$ is reached.

The signal thus passed from count position $n_2/2$ of sequence counter 8 over signal wire 13 to sequence control 6 and within this to AND circuit element 49 has no effect on the control processes within the sequence control, because the other input of AND circuit element 49 is connected to signal wire 32, on which a signal is impressed only when sequence switch 40 is in the "control" position.

From count position $n_2$, sequence counter 8 now passes the signal marking the end of the measurement time over signal wire 9 to AND circuit element 62. As the other input of AND circuit element 62 also carries a signal, namely that passed to signal wire 16 by sequence switch 40 in the "measure" position, AND circuit element 62 thereupon sends to flip-flop 51, via OR circuit element 50 and wire 59, a signal constituting not only the terminal signal of the measurement period in progress, but also the release signal for changing-over flip-flop 51. With the rising slope of the next impulse in the train having pulse frequency $f_{kd}$ to arrive over wire 52, flip-flop 51 is changed over and thereupon passes to input lead 42 of sequence switch 40 the step-on switching signal.

This switching signal can advance sequence switch 40, however, only if there is a release signal for the purpose at input 41 of sequence switch 40.

Let us suppose for a moment that the balance was not quite in a state of rest during the previous measurement period and, hence, that the weight value ascertained by the weight counter during the measuring time does not agree with the comparison value determined by the auxiliary counter. In that case, coincidence circuit 11 will find that there is non-coincidence and will therefore not give any coincidence signal to signal wire 43, which connects the coincidence circuit to sequence control 6. In the sequence control, consequently, AND circuit element 44, one input of which is connected to signal wire 43, will remain closed. The other AND circuit element, 46, being connected through invertor 45 to signal wire 43, likewise remains closed, because its second input is connected to signal wire 32, on which a signal is impressed only when sequence switch 40 is in the "control" position. AND circuit elements 44 and 46 therefore pass no output signal to the OR circuit element; nor does OR circuit element 48 receive any input signal via the two inputs connected to the signal wires, 22 and 24, corresponding to the "multiply" and "indicate" positions. OR circuit element 48 therefore gives no step-on release signal to input wire 41 of sequence switch 40.

Sequence switch 40, therefore, in the absence of a coincidence signal, remains in the "measure" position even after the switching signal has been supplied via input lead 42, and the entire measurement period is once more repeated in the manner already described, beginning as the sequence switch is switched over from the "control" to the "measure" position.

FIGURE 4 provides graphically clearer general picture of the timing of the various signals in wires 7, 9, 13, 15, 16, 22, 24, 32, 41, 42, 43, 52, 57, 59, 60 and 61 at the change-over from one measurement period to a fresh measurement period.

If, now, the balance is in a state of rest when the measurement period is repeated and there are no other sources of error, the weight value ascertained by the weight counter during the measurement time in this fresh measurement period will agree with the comparison value determined by the auxiliary counter, at all events within the permissible tolerances. Otherwise, the measurement period will be repeated often enough to produce agreement. Then coincidence circuit 11 finds that agreement exists and passes a coincidence signal over signal wire 43 to AND circuit element 44. As the other input of AND circuit element 44 likewise carries a signal, namely that given by sequence switch 40 in the "measure" position to signal wire 16, AND circuit element 44 thereupon passes to input lead 41 of sequence switch 40 the step-on release signal.

If, now, as with the previous measurement period, the switching signal arrives over wire 42, sequence switch 40 is stepped on by the switching signal to the "multiply" position.

Following this, in the same way as already described in connection with the change-over from the control period to the measurement period, flip-flop 56, inverter 53 and AND circuit element 54 act to clear the auxiliary and sequence counters and then to restore the two flip-flops 51 and 56. Contrary to the change-over from the control to the measurement period, however, weight counter 4 is not cleared at the change-over from measurement period to multiplication, because AND circuit element 58 is closed when the clearing signal arrives over wire 15; for sequence switch 40, when this clearing signal arrives, is already in the "multipyl" position and therefore gives no input signal to the other input of AND circuit element 58, which is connected to signal wire 16.

FIGURE 5 provides graphically a clearer general picture of the timing of the various signals in wires 7, 9, 13, 15, 16 22, 41, 42, 43, 52, 57, 60 and 61 at the change-over from a measurement period to a multiplication period.

When passing to the "multiply" position, sequence switch 40 impresses on signal wire 22 a signal which is fed over this wire to multiplier 17 and brings about the multiplication of the weight value held in weight counter 4 by the unit price of the goods placed on balance 3, as keyed by unit 18.

As soon as this multiplication is complete, multiplier 17 passes to flip-flop 51, by way of signal wire 23, OR circuit element 50 and wire 59, a signal marking the end of multiplication, which is both the terminal signal of the current period and the release signal for changing over flip-flop 51. With the rising slope of the next impulse of the train having pulse frequency $f_{kd}$ to arrive over wire 52, flip-flop 51 is now changed over, thereupon passing the step-on switching signal to input lead 42 of sequence switch 40.

There already being a step-on release signal at input 41 of sequence switch 40, which is supplied by the sequence switch itself in the "multiply" position via signal wire 22 and OR circuit element 48, the switching signal arriving over input lead 42 advances the sequence switch to the "indicate" position.

Following this, in the same way as described above in connection with the change-over from the control period to the measurement period, flip-flop 56, invertor 53 and AND circuit element 54 act to clear the auxiliary and sequence counters and then to restore the two flip-flops 51 and 56. Contrary to the change-over from control period to measurement period, however, weight counter 4 is not cleared at this change-over from multiplication to indication either, the same as at the change-over from measurement period to multiplication, because AND circuit element 58 is again closed when the clearing signal arrives over wire 15; for when this clearing signal arrives, sequence switch 40 is in the "indicate" position and therefore passes no input signal to the other input of AND circuit element 58, which is connected to signal wire 16.

FIGURE 6 provides graphically a clearer general picture of the various signals in wires, 7, 15, 16, 22, 23, 24, 41, 42, 52, 57, 59, 60 and 61 at the change-over from a multiplication period to an indication period.

Passing to the "indicate" position, sequence switch 40 impresses on signal wire 24 a signal which is fed over wire 24 to the inputs of gates 25, 26 and 27 and opens them. Following this, weight indicator 19 is set to the weight value held in weight counter 4, price indicator 20 to the price of the goods held in multiplier 17 and unit-price indicator 21 to the unit price of the goods fed into keyboard 18. As soon as these settings have been carried out, each of the indicators 19, 20 and 21 sends a signal to AND circuit element 28 marking the completion of setting.

As soon as the signals from all three indicators have arrived, AND circuit element 28 passes to flip-flop 51, via signal wire 29, OR circuit element 50 and wire 59, an end-of-indication signal, which constitutes both the terminal signal of the current period and the release signal for the changeover of flip-flop 51. With the rising slope of the next impule of the train having pulse frequency $f_{kd}$ to arrive over wire 52, flip-flop 51 is now changed over and thereupon passes the step-on switching signal to input lead 42 of sequence switch 40.

There already being a step-on release signal at input 41 of sequence switch 40, supplied by the sequence switch itself in the "indicate" position by way of signal wire 24 and OR circuit element 48, the switching signal arriving over input lead 42 steps the sequence switch on to the "control" position and thus initiates the first control period after indication of the values determined.

Following this, in the same way as already described in connection with the change-over from the control period to the measurement period, flip-flop 56, invertor 53 and AND circuit element 54 act to clear the auxiliary and sequence counters and then to restore the two flip-flops 51 and 56. Contrary to the change-over from control period to measurement period, however, weight counter 4 is not cleared at this change-over from indication to control period either, the same as in the case of the change-overs from measurement to multiplication and multiplication to indication, because, when the clearing signal arrives over wire 15, AND circuit element 58 is again closed; for sequence switch 40, when this clearing signal arrives, is in the "control" position and therefore gives no input signal to the other input of AND circuit element 58, which is connected to signal wire 16.

FIGURE 7 provides graphically a clearer general picture of the various signals in wires 7, 15, 16, 24, 29, 32, 41, 42, 52, 57, 59, 60 and 61 at the change-over from an indication period to a control period.

Upon the clearing signal in wire 15 being cut off and flip-flop 56 being restored, the auxiliary and sequence counters start counting. The requisite opening of gate 12, in front of the auxiliary counter input, has already been effected by the clearing of sequence counter 8 by the switch-through signals sent to gate 12, in the first place, by invertor 14 and, secondly, by sequence switch 40 by way of signal wire 32 and OR circuit element 33. Gate 5, in front of the weight counter input, remains closed, on the other hand, because the sequence switch stands in the "control" position and therefore gives no switch-through signal to the input of gate 5 connected to signal wire 16.

The commencement of counting, upon the clearing signal being cut off, starts the comparison time. The control period initiated by the stepping-on of sequence switch 40 is now carried out as already described in detail in connection with the explanation of FIGURE 1. Auxiliary counter 10 is thus stopped by the signal marking the end of the comparison time, which is passed by sequence counter 8 to signal wire 13 on reaching the count position $n_2/2$.

This signal marking the end of the comparison time is simultaneously fed over signal wire 13 to AND circuit element 49. As the other input of AND circuit element 49 is also carrying a signal, namely that passed by sequence switch 40 in the "control" position to signal wire 32, AND circuit element 49 thereupon sends to flip-flop 51, via OR circuit element 50 and wire 59, a signal which is both the terminal signal of the control period in progress and the release signal for the change-over of flip-flop 51. With the rising slope of the next impulse of the train having pulse frequency $f_{kd}$ to arrive over wire 52, flip-flop 51 is now changed over, thereupon passing the step-on switching signal to input lead 42 of sequence switch 40.

However, this switching signal can advance sequence switch 40 only if there is a step-on release signal at input 41 of sequence switch 40.

Let us assume for a moment that the balance has continued to be at rest and hence that the comparison value arrived at by the auxiliary counter agrees, as all events within the permissible tolerances, with the measurement value found during the previous measurement period and still in the weight counter. In that case, coincidence circuit 11 will find that agreement exists and will therefore emit a coincidence signal over signal wire 43 to the input of invertor 45 and to one input of AND circuit element 44. Upon the arrival of the coincidence signal, invertor 45 will interrupt the signal supplied over wire 47 to AND circuit element 46, so that AND circuit element 46 is closed with the coincidence signal. The other AND circuit element, 44, connected to signal wire 43, will likewise remain closed, because its second input is connected to signal wire 16, on which a signal is impressed only when sequence switch 40 is in the "measure" position. AND circuit elements 44 and 46 therefore give no output signal to OR circuit element 48; nor does OR circuit element 48 receive any input signal via the two inputs connected to the signal wires, 22 and 24, corresponding to the "multiply" and "indicate" positions. OR circuit element 48 therefore emits no step-on release signal to input lead 41 of sequence switch 40.

Hence, where agreement is found between the comparison value determined during the control period and the measurement value in the weight counter, because of the resultant absence of any step-on release signal, sequence switch 40 remains in the "control" position even after the switching signal has been fed to input lead 42; and the control period is repeated in the manner described above (beginning prior to the stepping of the sequence switch from the "indicate" to the "control" position) until non-coincidence is found during a control period.

Non-coincidence will be found when comparing the comparison value determined in the control period with the measurement value in the weight counter, for instance, at the end of the control period in which the weight previously applied is removed. In that case, the same process as already described, with continuously repeated control periods as starting point, will take place from the beginning; and at the end of the process the ascertained weight value zero will be indicated by weight indicator 19 and the ascertained price zero will be indicated by price indicator 20, control then being carried out once more in continuously repeated control periods.

FIGURE 8 provides graphically a clearer general picture of the various signals in wires, 7, 13, 15, 16, 32, 41, 42, 43, 52, 57, 59, 60 and 61 at the change-over from one control period to a fresh control period.

It was stated earlier, in connection with the subdivision of measurement and comparison times, that, given an adequate margin in the accuracy of measurement required or the permissible duration of periods, a subdivision could be chosen whereby the measurement time and comparison time followed each other.

In that case, the measurement and comparison values can be determined with one and the same counter, but then one must have available a store into which the value determined first can be put, to enable it to be compared with the second value, when found.

If this comparison reveals agreement, the value held in the store is equal to the measurement result sought. The store could therefor—subject to its not indicating the stored value until agreement had been found between the measurement and comparison values—be used directly for indication.

There would be particular advantage in designing the store itself as an indicator for this purpose, for such a unit does hold the numerical setting pending further setting and so stores it. Against this, however, is the fact that the store, at the outset, has to store uncontrolled values for feeding to the comparison circuit; and uncontrolled values must naturally not be indicated, since the very purpose of the comparison circuit is to ensure the indication of nothing but values that have been checked for accuracy or agreement.

This objection to the improved design of the store as an indicator can be eliminated, however, by the use of a flap across the indicator window, which opens only after the measurement and comparison values have been found to agree, that is to say when there is coincidence, and is closed again when there is non-coincidence; or by equivalent means, such as visual indication by means of a light, the projection lamp being switched on for coincidence and off for non-coincidence.

Designing the store as an indicator opens the further possibility of taking the value that is to be fed from the store to the comparison circuit directly from the means used for indication—in the case of mechanical indicators, for example, from numeral wheels provided additionally with a binary code. This offers the further advantage that the comparison circuit checks the indicated value directly.

FIGURE 9 shows a particularly advantageous example of such an evaluation unit, in which the measurement and comparison values are determined by one and the same counter and the store is designed as an indicator.

In explaining the mode of operation of this unit, it will be assumed that, to begin with, no weight is lying on the string balance connected to inputs 63 and 64, the evaluation unit checking, in continuously recurring control periods, the zero weight value arrived at in a previous measurement period. In these circumstances, a zero weight value will be held (retained) in retaining means indicator store 65, and this value will be indicated, that is to say that a flap provided for covering the indicator window will be open.

During such a control period, a weight is now laid on the balance. The two pulse frequencies $f_{kd}$ and $f_2$ of the pulse trains fed to inputs 63 and 64 are thereby altered. A larger or smaller portion of the weight laid on will now be counted (stored) by storage means, here counter 67, according to how much of the control period in progress has already elapsed when the weight is put on and according to the setting of sequence counter 66 when the weight is put on compared to its setting $n_2$, which determines the end of a measurement or camparison time. As soon as the sequence counter has reached the setting $n_2$, it impresses a terminal signal on signal wire 68. This terminal signal is first fed to invertor 69, which cuts off the switch-through signal being hitherto given to gate 70, which precedes the counter input, and thus stops counter 67. The setting of counter 67 at that moment is not zero, since this has in fact counted part of the weight. Indicator store 65, on the other hand, still contains the value zero. Coincidence circuit 71, comparing the setting of counter 67 with the numerical value in indicator store 65, therefore finds non-coincidence at that moment and does not send any coincidence signal to signal wire 72.

At that moment, then, that is to say at the moment the terminal signal from sequence counter 66 arises, there is no release signal at input 73 of the J–K flip-flop, 75, which constitutes the sequence switch, whereas the other input, 74, of the flip-flop receives a release signal from invertor 76. As the switching signal to be fed over wire 68 to J–K flip-flop 75 is formed by the rising slope of the terminal signal from the sequence counter, flip-flop 75 is moved at the moment to the "measure" position and now sends a switch-through signal over wire 78 to gate 79, simultaneously sending to indicator store 65 a signal by which the flap provided as already mentioned for covering the indicator window is caused to close.

As the other criterion for the opening of gate 79, namely the terminal signal from the sequence counter supplied via wire 68, is already available when the switch-through signal sent over wire 78 by flip-flop 75 arrives, this switch-through signal opens gate 79 and the value held in counter 67 is passed to indicator store 65, which is set to the value held in counter 67. On completion of this setting, indicator store 65 sends a terminal impulse over wire 80, which clears the counter and the sequence counter and restores counter 67 to a negative setting equivalent to basic load $G_0$ and sequence counter 66 to zero.

Upon clearance, the setting of the sequence counter falls below $n_2$ again, so that the terminal signal of the sequence counter is interrupted. The interruption of this terminal signal closes gate 79, so that counter 67 is again separated from the indicator store, and simultaneously gate 70, preceding the counter input, is once more opened by way of invertor 69, which, when this terminal signal is interrupted, sends a switch-through signal to gate 70.

At this moment, the partial weight value arrived at by counter 67 during the preceding control period stands in indicator store 65, the flap over the indicator window is closed and the sequence switch, in the form of flip-flop 75, stands at "measure."

With the ending of the terminal impulse, constituting the clearing impulse for counter and sequence counter, which is passed to wire 80 by indicator store 65, the counter and sequence counter now begin to count. As soon as the sequence counter has reached the setting $n_2$, the counter is stopped once more by means of the sequence-counter terminal signal, which closes gate 70 by way of invertor 69, and now counter 67 contains a value corresponding to the weight laid on the balance. However, as the partial weight value arrived at in the preceding control period is still held in indicator store 65, comparison by coincidence circuit 71 between the value in the counter and that in the indicator store still reveals no coincidence, so that the sequence switch in the form of flip-flop 75 remains in the "measure" position and, hence, the flap in front of the indicator window stays closed and the new value in counter 67 is now passed to indicator store 65. When indicator store 65 has been set to this value, it again emits a terminal impulse, which clears counter 67 and sequence counter 66 and thus closes gate 79 between counter and indicator store and opens gate 70, preceding the counter input.

At that moment, the weight value arrived at by the counter during the preceding measurement time is held in the indicator store, the sequence switch formed by flip-flop 75 still stands at "measure" and the flap over the indicator window is accordingly still closed.

Let us now assume that the balance was not completely at rest during this measurement time and the weight value determined by counter 67 and now in indicator store 65 still differs slightly from the actual weight. Let it also be assumed that the counter now ascertains the actual weight value during the next time period, beginning with the terminal impulse from indicator store 65. Then comparison at the end of this time period will again not show coincidence, the sequence switch will remain in the "measure" position, the flap will stay closed and a count corresponding to the actual weight value will be passed to indicator store 65. The terminal impulse from the indicator store then clears both the counters, closes gate 79 and opens gate 70.

At the moment, therefore, the actual weight value ascertained by counter 67 during the preceding second measurement time is held in indicator store 65, the sequence counter formed by flip-flop 75 is still at "measure" and the flap over the indicator window is accordingly still closed.

The balance is now at rest and the counter therefore again records the actual weight value during the next count time, starting from completion of the terminal impulse from indicator store 65. Coincidence circuit 71 therefore finds agreement, between the value held in indicator store 65 and the value in counter 67 at the same moment when sequence counter 66 reaches the setting $n_2$. Sequence counter 66 then impresses the terminal signal on signal wire 68, while a coincidence signal is sent along signal wire 72 from coincidence circuit 71. Now, therefore, at the moment the terminal signal from sequence counter 66 occurs, a release signal is at input 73 of flip-flop (sequence switch) 75, while the other input, 74, of the flip-flop receives no release signal from inverter 76.

Since, as already mentioned, the switching signal to be fed to J-K flip-flop 75 over wire 68 is formed by the rising slope of the terminal signal from the sequence counter, flip-flop 75 is thereupon changed over to the "control" position and now supplies to indicator store 65, over wire 77, a signal which causes the flap provided as stated for covering the indicator window to be opened, so that the actual weight value held in indicator store 65 is now indicated.

Since transmission of the value in counter 67 to the indicator store at this moment, because of the agreement during comparison, is not necessary, the indicator store supplies the terminal impulse marking completion of its setting, in this case, shortly after the arrival of the terminal signal from the sequence counter over wire 68 and of the control and indication signal over wire 77. The terminal impulse from the indicator store brings about, in the same way as already described, the clearance of counter 67 and sequence counter 66 and so opens gate 70 at the counter input.

At this moment, the indicator store is holding the weight value determined during the said second measurement time and checked, at the end of the preceding comparison time, for agreement with the comparison value determined by counter 67, the sequence switch represented by flip-flop 75 now standing at "control, indicate," and the flap over the indicator window is accordingly opened, so that the weight value held in the indicator store is displayed.

If the balance remains at rest, control periods are then carried out in which the counter once more ascertains the actual weight value in each of the count periods beginning on completion of the terminal impulse from the indicator store. At the end of each of these count periods, therefore, comparison again shows coincidence, the sequence switch remains in the "control, indicate" position, the flap remains open and the indicator store, shortly after the arrival of the terminal signal from the sequence counter, supplies the terminal impulse by which a fresh count period or a fresh control period is initiated.

Should the weight on the balance change, by virtue, for instance, of the weight previously placed on it being removed, the same process as above described takes place from the beginning, starting from continuously repeated control periods; and at the end of the process, the weight value zero recorded by indicator store is displayed and then once more controlled during continuously repeated control periods.

In connection with FIGURE 9, it remains to be mentioned that, just as with the example shown in FIGURE 1, to increase the range of tolerance during comparison in control periods, gates can naturally be provided between indicator store 65 and coincidence circuit 71 and between counter 67 and the coincidence circuit, the effect of these being that the very low binary figures of the values in counter 67 and indicator store 65 are brought into the comparison only in measurement periods, and not in control periods. The switch-through signals will be fed, in that case, over wire 78, which has a signal impressed on it when sequence switch 75 is in the "measure" position.

In addition, with the evaluation unit shown in FIGURE 9, just as with that shown in FIGURE 1, a multiplier, a product indicator, a keyboard for keying a unit price into the multiplier and a unit-price indicator can also be provided. In that case, the multiplier factor input is connected to the interconnecting wire, 81, between indicator store 65 and coincidence circuit 71, and the input for carrying out the multiplication is connected to wire 77, on which a signal is impressed when sequence switch 75 is in the "control, indicate" position. Furthermore, the multiplier output for the end-of-multiplication terminal signal is connected to the gates between the product indicator and the multiplier and between the keyboard and the unit-price indicator, so that the terminal signal from the multiplier provides the switch-through signal for these gates.

As regards the interior of the components represented as blocks in FIGURE 9, the following explanation may be given here:

The interior of sequence counter 66 corresponds, as in the case of sequence counter 8 in FIGURE 1, to that of the electronic counters generally familiar in digital technique, with setting leads for adjustment of the counter at the commencement of counting, an input lead for the count impulses in the first binary stage and at least one output connected to the counting stage operative from counter position $n_2$. Of the setting leads, those which, when a signal is given, bring about the adjustment of the counter to zero, are connected to signal wire 80, which carries the clearing impulse. The input lead for the count impulses is connected to input 63 of the evaluation unit shown in FIGURE 9, the output being connected to signal wire 68.

The interior of counter 67, as in the case of weight counter 4 in FIGURE 1, corresponds likewise to the electronic counters generally familiar in digital technique, with setting leads for adjustment of the counter at the commencement of counting, one output per binary stage for putting out the reading at any given moment and an input lead for the count impulses at the first binary stage. Of the setting leads, those which, when a signal is given, bring about the adjustment of the counter to a negative setting equivalent to basic load $G_0$ are connected to signal wire 80, which carries the clearing impulse. The outputs are connected to indicator store 65 through an appropriate number of gates, symbolized in FIGURE 9 by gate 79. In addition, the outputs of all the binary figures to be compared are connected to the appropriate inputs of coincidence circuit 71. The input for the count impulses is connected to the output of gate 70.

The interior of indicator store 65 corresponds, apart from one or two extras, which will be referred to later, to the indicators generally familiar in digital technique, with electronically controlled setting mechanisms and a group of inputs over which the signals for setting are passed into the unit, as well as an output for supplying a signal on completion of setting. Numeral wheels are used for display purposes. These are additionally provided with a binary code, which can be explored by photo-electric cells provided for the purpose. Thus, the outputs of these cells supply in code form the numerical value set up in the indicator store. In addition, the indicator store is provided with a flap for covering the indicator window, as well as an electro-magnet for opening and closing the flap. The indicator store also has an AND circuit element, the output of which is connected to the output for supplying the terminal signal, one of its inputs being connected to the control lead for energizing the electro-magnet to open the flap and the other to the output of a delay component. The inputs through which the signals for setting are passed into the unit are connected, as already mentioned in connection with the interior of counter 67, through an appropriate number of gates, symbolized in FIGURE 9 by gate 79, to the corresponding outputs of counter 67. The output for supplying the terminal signal on completion of setting is connected to signal wire 80. The outputs of the photo-electric cells are connected, for all the binary figures to be compared, to the appropriate inputs of coincidence circuit 71. The control lead for energizing the electro-magnet to close the flap is connected to signal wire 78, the control lead for energizing the electro-magnet to open the flap being connected to signal wire 77. The input of the delay component is connected to signal wire 68.

The interior of coincidence circuit 71 corresponds to the coincidence circuits generally familiar in digital technique, with one pair of coincidence inputs for each binary figure to be compared and an output for supplying coincidence signals. As already described in connection with the interior of counter 67 and indicator store 65, the coincidence inputs are connected to the appropriate outputs of the counter and of the photo-electric cells in the indicator store. The output of the coincidence circuit is connected to signal wire 72.

The interior of flip-flop 75 corresponds to the so-called "J–K" flip-flops generally familiar in digital technique. A J–K flip-flop consists of an ordinary flip-flop, with one setting wire and one output wire each for the two positions, both setting wires being connected to the outputs of one AND circuit element in each case. One input of each of the two AND circuit elements constitutes the signal input for the release signal for switching over to the position concerned. Both the other inputs of the two AND circuit elements are connected via a differential component to the signal input for the step-on switching signal. The two release-signal inputs of J–K flip-flop 75 are 73 and 74, the switching-signal input is connected to signal wire 68 and the two outputs are connected to signal wires 77 and 78.

As regards the term "string balance" used in the foregoing, it should be mentioned that this term, within the meaning of the present invention, refers both to string balances in which mass comparison is made and to those in which force comparison is made. In the case of balances with mass comparison, the mass of the weight that is to be determined is compared with a reference mass, whereas, in the case of balances with power comparison, which are also called "dynamometers" in physical terminology, the gravity of the weight that is to be determined is compared with an opposing force, such as that of a spring, for example. Instead of the gravity of a weight that is to be determined, it is naturally possible, with a string balance comparing forces, to measure any other desired force. The term "string balance" used here does not therefore restrict the measuring process of this instrument to the determination of weights alone, but includes also the measurement of forces made possible by it.

In conclusion, it should also be stressed that the invention is not limited to the two practical examples described in the foregoing, but that a whole range of other evaluation units embodying the invention principle are possible.

What I claim is:

1. An evaluation apparatus for checking the accuracy of a measurement device, said measurement device providing at least one pulse train, the frequency of said pulse train being both dependent on and usable in determining a value measured by said measurement device, comprising in combination:

sequence timing means for generating, and controlling the time length of, measuring and comparison times;

control means for determining measurement and control periods which have predetermined time relationships to said measuring and comparison times;

means responsive to said measurement device and said sequence timing means for storing the pulses of said pulse train throughout the length of said measuring time to determine a measurement value from the totality of said pulses thus stored;

said means for storing including means for retaining said measurement value therein during said control periods;

said means for storing also including storage means storing pulses from said pulse train throughout the length of each comparison time for determining a new comparison value for each comparison time and against which said measurement value may be checked;

coincidence circuitry means for comparing said measurement value and said comparison values;

said control means being responsive to a coincidence of said measurement value and one of said comparison values for initiating one of said control periods, and which is also responsive to noncoincidence of said measurement value and said one of said comparison values for initiating one of said measurement periods;

whereby noncoincidence of said measurement value and said one comparison value reflects possible error in the determination of said measurement value and causes a redetermination of said measurement value.

2. An apparatus according to claim 1, wherein said means for retaining includes means for carrying out said storing of pulses of said pulse train throughout the length of the measuring time to determine said measurement value.

3. An apparatus according to claim 2, wherein said retaining means comprises first counter means for determining the measurement value by counting pulses of the pulse train over a measuring time during the measurement period and which retains said measurement value during said control periods;

said storage means comprises second counter means for determining one comparison value in each measurement period and in each control period by counting pulses of the pulse train, said comparison value being determined during a comparison time which lies within each said measurement and control periods;

said coincidence circuitry means comparing the measurement value with the comparison value in each said measurement and control periods; and said control means feeding said pulse train to both said first counter means and said second counter means.

4. An apparatus according to claim 3, wherein said timing means provides a comparison time which is approximately one-half the measuring time and, during measurement periods, falls within the time interval defining the measuring time; and said second counter means produces from said pulses per unit time a comparison value which is twice as great as the measurement value produced from the same output signals per unit time.

5. An apparatus according to claim 3, wherein said timing means provides a comparison time which is as great as the measuring time with both the measuring time and the comparison time following one another within the measurement period; and said second counter means produces from said pulses per unit time a comparison value which is as great as the measurement value produced from the same output signals per unit time.

6. An apparatus according to claim 3, wherein said control means includes a sequence control device which, in the event of coincidence in comparison, imposes the measurement value contained in the first counter means on one or more outgoing wires and clears the second counter means and initiates a control period, said sequence control in the event of coincidence in comparison permitting the measurement value in the first counter means to be held therein with the pulses being fed only to said second counter means for determination of a new comparison value; and said sequence control device in the event of noncoincidence in comparison clears both said first counter means and said second counter means and initiates a further measurement period and permits the pulses to be fed both to the first counter means for determining a new measurement value and to the second counter means for determining a new comparison value.

7. An apparatus according to claim 3, wherein said measurement device comprises a string balance, said one pulse train having a pulse frequency which increases with the weight put on the balance and is equal to the product $k$ times $f_d$, where $f_d$ is the difference between the frequency $f_1$ and $f_2$ of two strings of the balance and $k$ is any positive integer, said string balance emitting a second pulse train having a string frequency $f_2$ falling as the weight increases, the quotient of $f_d/f_2$ being proportional to the sum of the weights put on the balance and a selected constant basic value;

said first counter means comprising a main counting device for determining the weight by counting those impulses of the first pulse train which fall within the measuring time;

said second counter means comprising an auxiliary counting device for determining the comparison values by counting those impulses of the first pulse train which fall within the comparison time;

said timing means comprising a sequence counting device for fixing the duration of measuring and comparison times in each instance by counting predetermined numbers of impulses of the second pulse train;

said coincidence circuitry means comparing the setting of the main counting device, which constitutes the measurement value after the measuring time, with the setting of the auxiliary counting device, which constitutes the comparison value after the comparison time;

said control means (1) initiating a control period in the case of coincidence and (2) initiating a further measurement period in the case of noncoincidence and supplying the impulses of the first pulse train to the main counting device and the auxiliary counting device; and means for adjusting the main counting device and the auxiliary counting device, before the commencement of counting, to a setting which takes account of the basic value.

8. An apparatus according to claim 7, in which said control means carries out, at the end of a period, an initial comparison of the setting of the auxiliary counting device with that of the main counting device, as well as further comparisons, prior to which the setting of the auxiliary counting device is increased in each case by a given number of counting units, said control means also bringing the auxiliary counting device, at the start of the period, by means of the clearing impulse, to a setting which is lower by a compensating value than the setting of the main counting device brought about by means of a clearing impulse, this compensating value being at least approximately equal to one-half the sum of the increases in all possible comparisons.

9. An apparatus according to claim 7, in which said control means includes a sequence control and first gate means between a signal wire carrying the first pulse train and the main counting device and second gate means between said signal wire and the auxiliary counting device;

said sequence control including means for testing the sequence counting device and said coincidence circuitry means, for clearing the main, auxiliary and sequence counting devices and for opening the gate means;

said sequence control on receipt of a terminal signal marking the expiration of a period initiating a control period by supplying signals for clearing the main and sequence counting devices and opening the second gate means during the comparison time, and initiating a further measurement period by supplying signals for clearing the main, auxiliary and sequence counting devices and opening the first gate means during the measuring time and for switching the auxiliary counting device through during the comparison time, and in which the signals for clearing the main and auxiliary counting devices restore the counting devices to negative settings equivalent to the basic value.

10. An apparatus according to claim 9, in which said timing means provides a comparison time which is one-half of the measuring time and during measurement periods falls within the measuring time;

in which said second counter means produces a comparison value from a pulse quantity per unit time twice as great as the measurement value produced from the same pulse quantity per unit time;

the main counting device during a measurement period counting the impulses in the first pulse train by counting one unit for each input impulse, said main counting device after the second time signal being stopped, in the case of coincidence, by the closing of the first gate means and, in the case of noncoincidence, being cleared by the clearing signal, and the auxiliary counting device counting two units for each input impulse.

11. An apparatus according to claim 9, in which the timing means provides a comparison time which is as great as the measuring time and both times follow each other during measurement periods and in which the second counter means produces a comparison value from a pulse quantity per unit time which is as great as the measurement value produced from the same pulse quantity in the same unit time; and in which the main counting device, during a measurement period, when the sequence counting device continues counting after the first time signal, begins to count the impulses of the first pulse train and records one counting unit at each input impulse and is stopped after the second time signal in the case of coincidence by the closing of the first gate means and is cleared by the clearing signal in the case of noncoincidence, and in which the auxiliary counting device likewise records one counting unit at each input impulse.

12. An apparatus according to claim 1 wherein said storage means includes means for carrying out said storing of pulses of said pulse train throughout the length of the measurement time to determine said measurement value;

said first-mentioned control means including second control means for transferring the measurement value from said storage means to said means for retaining, said means for retaining carrying out said retaining of said measurement value therein during at least one subsequent measurement or control period.

13. An apparatus according to claim 12, wherein said storage means comprise counter means for determining a measurement value by counting pulses of the pulse train over a measuring time during a measurement period and also far determining one of a comparison and a further measurement value in the following period by counting pulses of the pulse train over one of a comparison time and a further measurement time during said following period, said measurement value being transferred to and being held in said retaining means during said following period;

said coincidence circuitry means comparing the measurement value held in said retaining means with said one value determined in said following period by said storage means; and said first-mentioned control means initiating a control period in the case of coincidence and initiating a further measurement period in the case of noncoincidence.

14. An apparatus according to claim 13, wherein said retaining means includes indication means for indicating the measurement value stored therein.

15. An apparatus according to claim 13, wherein said measurement device comprises a string balance, said one pulse train having a pulse frequency which increases with the weight put on the balance and is equal to the product $k$ times $f_d$, where $f_d$ is the difference between the frequency $f_1$ and $f_2$ of two strings of the balance and $k$ is any positive integer, said string balance emitting a second pulse train having a string frequency $f_2$ falling as the weight increases, the quotient of $f_d/f_2$ being proportional to the sum of the weights put on the balance and a selected constant basic value;

said counting means including a counting device for determining the weight by counting those impulses of the first pulse train which fall within the measuring time and for determining the comparison values by counting those impulses of the first pulse train which fall within the comparison times;

said retaining means comprising an adjustable numerical storage device for retaining a measurement value determined during a preceding period by virtue of the numerical storage device being adjusted to the setting of the counting device after the measuring time in said preceding period;

said timing means comprising a sequence counter for determining the duration of the measuring time and the comparison time by counting predetermined numbers of impulses in the second pulse train;

said coincidence circuitry means comparing the value retained in the numerical storage device with the value determined by the counting device; and said first-mentioned control means initiating a control period in the case of coincidence of said values and initiating a further measurement period in the case of noncoincidence of said values, said control means also setting the numerical storage device to the setting of the counting device at the beginning of a control period as well as setting the counting device each time before the commencement of counting to a setting which takes account of the basic value.

16. An apparatus according to claim 15, wherein said numerical storage device includes indicating means for indicating the numerical value retained therein, said numerical value being supplied to the coincidence circuitry means for comparison with the value determined by the counting device.

17. An apparatus according to claim 2, wherein said measurement device comprises a string balance, said one pulse train having a pulse frequency which increases with the weight put on the balance and is equal to the product $k$ times $f_d$, where $f_d$ is the difference between the frequency $f_1$ and $f_2$ of two strings of the balance and $k$ is any positive integer, said string balance emitting a second pulse train having a string frequency $f_2$ falling as the weight increases, the quotient of $f_d/f_2$ being proportional to the sum of the weights put on the balance and a selected constant basic value;

said storage means including an auxiliary counting device for determining the comparison value by counting those impulses of the first pulse train which fall within the comparison time;

said retaining means determining the weight in each measurement period by counting those impulses of the first pulse train which fall within a measuring time during the measurement period;

said timing means including a sequence counting device for determining the duration of the measuring time and the comparison time by counting predetermined numbers of impulses of the second pulse train;

said coincidence circuitry means comparing the determined measurement value with the determined comparison value;

said control means initiating a control period in the case of coincidence of said values and initiating a further measurement period in the case of noncoincidence of said values; and means for adjusting said retaining and storage means each time before the commencement of counting to a setting which takes account of the basic value.

18. An apparatus according to claim 17, further including multiplier means for multiplying the weight by a factor which is of significance to further measurement results obtainable from the weight; second control means for carrying out the multiplication after a measurement period in the event fo coincidence; and means for feeding the setting of the retaining means and the factor into the multiplier means, and means for feeding out the product.

19. An apparatus according to claim 18, further including a product indicator and means for setting the product indicator to the product ascertained by the multiplier means;

gate means between the multiplier means and the product indicator which are opened on completion of multiplication; and in which the means for setting the product indicator emits a product-indicator terminal signal once the indicator has been set to the product ascertained.

20. An apparatus according to claim 18, in which the factor is an adjustable unit price, and further including a keyboard means for setting the unit price;

a unit-price indicator and means for setting the unit-price indicator to the unit price set on the keyboard means; and in which the means for setting the unit-price indicator emits a unit-price-indicator terminal signal once the indicator has been set to the unit price.

21. An apparatus according to claim 18, in which the auxiliary counting device is used during the multiplication period as a multiplier store.

22. An apparatus according to claim 18, further including a weight indicator and means for adjusting the weight indicator after a measurement period, in the case of coincidence, to the setting of the retaining means, the means for adjusting the weight indicator including gate means between the retaining means and the weight indicator which, in the case of coincidence, are opened after a measurement period, said adjusting means once the indicator has been adjusted to the setting of the retaining means emitting a weight-indicator-terminal signal;

a product indicator and means for setting the product indicator to the product ascertained by the multiplier means, said means including gate means between the multiplier means and the product indicator which are opened on completion of multiplication, said means for setting the product indicator emitting a product indicator terminal signal once the indicator has been set to the product ascertained; and AND gate means for emitting an end-of-indication signal when all three terminal signals from the weight, product and unit-price indicator have been supplied thereto.

23. An apparatus according to claim 17, further including a sequence switch means which determines the measuring and control operational condition of the apparatus, said sequence switch means having one outlet for each of these conditions and being settable by means of controls for testing the sequence counting device and coincidence circuitry means and emitting according to its setting via the appropriate output the signals for gate means to be opened in the operational condition to which the sequence switch means is set.

24. An apparatus according to claim 23, in which the sequence switch means comprises a step-by-step switch to which the controls for testing the coincidence circuitry means pass a release signal and to which the controls for testing the sequence counting device pass a switching signal; and in which the controls for testing the coincidence circuitry means supply a release signal in the case of coincidence during a measurement period and in the case of non-coincidence during a control period, but do not supply a release signal in the case of non-coincidence during a measurement period or coincidence during a control period, the signals for identifying the particular period in progress or the operating condition for which the setting has been made being supplied by the sequence switch means via the appropriate outputs.

25. An apparatus according to claim 24, in which the sequence switch means contains an electronic counter with a number of counting positions corresponding to the number of operating conditions and one output for each counting position; and an AND gate means for switching said sequence switch means, said AND gate means having one input connected to the controls for testing the coincidence circuitry means and another input connected to the controls for testing the sequence counting device.

26. An apparatus according to claim 24, further including a weight indicator and means for adjusting the weight indicator after a measurement period, in the case of coincidence, to the setting of the retaining means, the means for adjusting the weight indicator including gate means between the retaining means and the weight indicator which, in the case of coincidence, is opened after a measurement period, said means once the indicator has been adjusted to the setting of the retaining means emitting a weight-indicator-terminal signal; and in which the sequence switch means has three switch positions which can be switched in one after the other, in which when the switch is in an indication switch position it supplies a switch-through signal via the appropriate output to the gate means between the retaining means and the weight indicator and supplies the release signal to its release-signal input via an OR gate means allotted to the controls for testing the coincidence circuitry means, and in which the weight-indicator-terminal signal is fed to an OR gate means allotted to the controls for testing the sequence counting device and sets off the switching signal for switching the sequence switch means to a control switch position.

27. An apparatus according to claim 24, further including a weight indicator and means for adjusting the weight indicator after a measurement period, in the case of coincidence, to the setting of the retaining means, the means for adjusting the weight indicator including first gate means between the retaining means and the weight indicator which, in the case of coincidence, is opened after a measurement period, and in which the said means once the indicator has been adjusted to the setting of the retaining means emits a weight-indicator-terminal signal;

a multiplier means for multiplying the weight by a factor which is of significance to further measurement results obtainable from the weight and including second control means for carrying out the multiplication after a measurement period in the event of coincidence, as well as means for feeding in the setting of the retaining means and the factor and means for feeding out the product;

a product indicator and means for setting the product indicator to the product ascertained by the multiplier means, and second gate means between the multiplier means and product indicator which is opened on completion of multiplication, and in which the means for setting the product indicator emits a product-indicator-terminal signal once the indicator has been set to the product ascertained; and in which said factor is an adjustable unit price and including keyboard means for setting the unit price, a unit-price indicator and means for setting the unit-price indicator to the unit price set on the keyboard means, third gate means between the keyboard means and the unit-price indicator, and in which the means for setting the unit-price indicator emits a unit-price-indicator terminal signal once the indicator has been set to the unit price;

an AND gate means for emitting an end-of-indication signal when all three terminal signals of the weight, product and unit-price indicators have been supplied thereto as input signals;

said sequence switch means having control, measurement, multiplication and indication switching positions which can be switched in one after the other, said sequence switch means when in the multiplication position supplying to the multiplier means via the appropriate output the signal for carrying out the multiplication and supplying the release signal to its release-signal input through a first OR gate means allotted to the controls for testing the coincidence circuitry means, said sequence switch means when in the indication position supplying the switch-through signal via the appropriate output to said first second and third gate means, and supplying the release signal to its release-signal input through the first OR gate means; and in which a terminal signal from the multiplier means is sent on completion of multiplication to a second OR gate means allotted to the controls for testing the sequence counting device and sets off the switching signal for switching the sequence switch means to the indication position and in which the indication terminal signal is likewise fed to the second OR gate means and sets off the switching signal for switching the sequence switch means to the control position.

References Cited

UNITED STATES PATENTS

| 2,880,612 | 4/1959 | Coyne et al. | 324—79 XR |
|---|---|---|---|
| 3,284,616 | 11/1966 | Ernyei et al. | 340—172.5 XR |
| 2,974,863 | 3/1961 | Williams et al. | 235—151.33 |
| 3,039,686 | 6/1962 | Bell et al. | 235—151.33 |
| 3,064,743 | 11/1962 | Marshall et al. | 235—58 |
| 3,205,956 | 9/1965 | Bell et al. | 235—151.33 |
| 3,274,377 | 9/1966 | Morison | 235—151.33 |
| 3,284,619 | 11/1966 | Wentzel et al. | 235—151.33 |
| 3,351,917 | 11/1967 | Shimabukuro | 340—172.5 |

PAUL J. HENON, Primary Examiner

HARVEY E. SPRINGBORN, Assistant Examiner

U.S. Cl. X.R.

235—151.33

UNITED STATES PATENT OFFICE
CERTIFICATE OF CORRECTION

Patent No. 3 503 047   Dated March 24, 1970

Inventor(s) Ellert Schaepman     Page 1

It is certified that error appears in the above-identified patent and that said Letters Patent are hereby corrected as shown below:

The title should read "EVALUATION UNIT USED IN CONJUNCTION WITH A MEASUREMENT DEVICE".

Column 1, line 5; the phrase "Claims priority, application Sweden" should read ---Claims priority, application Switzerland---.

UNITED STATES PATENT OFFICE
CERTIFICATE OF CORRECTION

Patent No. 3,503,047      Dated March 24, 1970

Inventor(s) Ellert Schaepman      Page 2

It is certified that error appears in the above-identified patent and that said Letters Patent are hereby corrected as shown below:

Column 30, line 47; the phrase "far determining one of a comparison" should read ---for determining one of a comparison value---.

Column 31, line 74; "fo" should read ---of---.

Column 34, line 27; insert a comma (,) after "first".

SIGNED AND SEALED
SEP 22 1970

(SEAL)
Attest:

Edward M. Fletcher, Jr.
Attesting Officer

WILLIAM E. SCHUYLER, JR.
Commissioner of Patents